Figure 1:
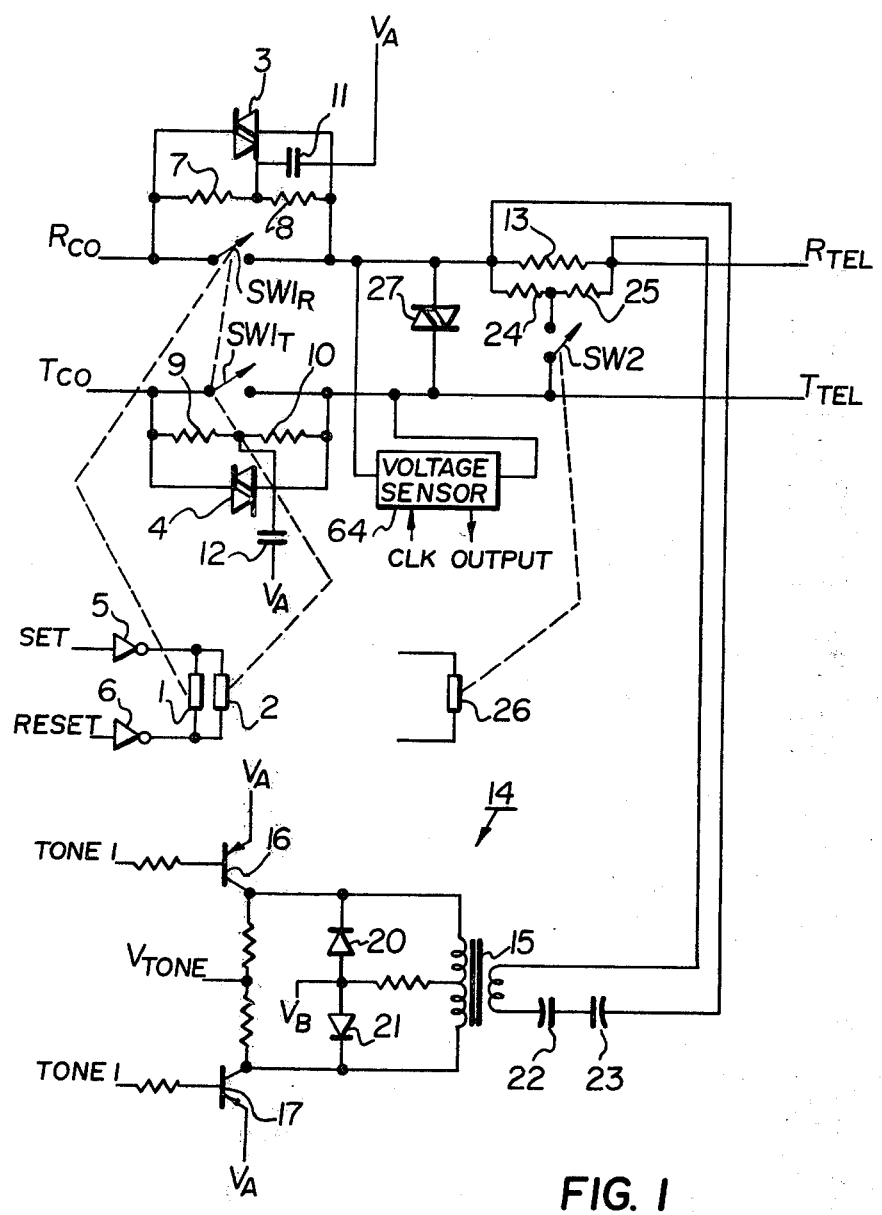

United States Patent [19]

Panizzon et al.

[11] 4,219,700
[45] Aug. 26, 1980

[54] PARTYLINE SUBSCRIBER INTERFACE CIRCUIT

[75] Inventors: Guido Panizzon, Edmonton; Jacob Cepelinski, Ottawa; Michael C. J. Cowpland, Ottawa; Paul S. Wilker, Ottawa, all of Canada

[73] Assignee: Mitel Corporation, Ontario, Canada

[21] Appl. No.: 941,676

[22] Filed: Sep. 12, 1978

[30] Foreign Application Priority Data

Mar. 13, 1978 [CA] Canada ................................. 298723

[51] Int. Cl.² ........................................... H04M 3/16
[52] U.S. Cl. ................................. 179/17 B; 179/18 AB
[58] Field of Search ..................... 179/17 B, 17 R, 30, 179/19, 18 AB, 18 B, 18 BD

[56] References Cited

U.S. PATENT DOCUMENTS

| | | | |
|---|---|---|---|
| 2,543,062 | 2/1951 | Ringkjob et al. | 179/30 |
| 3,499,121 | 3/1970 | McIntosh et al. | 179/17 B |
| 3,514,544 | 5/1970 | Chambers, Jr. | 179/17 B |
| 3,651,274 | 3/1972 | Angner et al. | 179/19 |
| 3,691,308 | 9/1972 | Angner et al. | 179/18 BH |
| 3,725,595 | 4/1973 | Mechanic-Esfahani | 179/17 B |
| 3,725,601 | 4/1973 | Jetzt et al. | 179/99 |
| 3,852,537 | 12/1974 | Vincent | 179/17 B |
| 3,920,902 | 11/1975 | Matsuo et al. | 179/99 |
| 3,997,731 | 4/1975 | Wilmot et al. | 179/18 B |
| 4,022,983 | 5/1977 | Braun et al. | 179/18 B |
| 4,117,274 | 9/1978 | Cannon et al. | 179/99 |

Primary Examiner—Thomas W. Brown
Attorney, Agent, or Firm—Craig and Antonelli

[57] ABSTRACT

A station set interface circuit for connection to a multi-party line, for prohibiting connection of a party line subscriber's set to the party line in the event the line is in use and for returning busy tone to the subscriber's set. A hookswitch flash by the subscriber causes the circuit to connect the subscriber's set to the party line for a predetermined period, while applying a warning tone to the party line for transmission to the parties of the call in progress at the beginning and end of the period.

45 Claims, 11 Drawing Figures

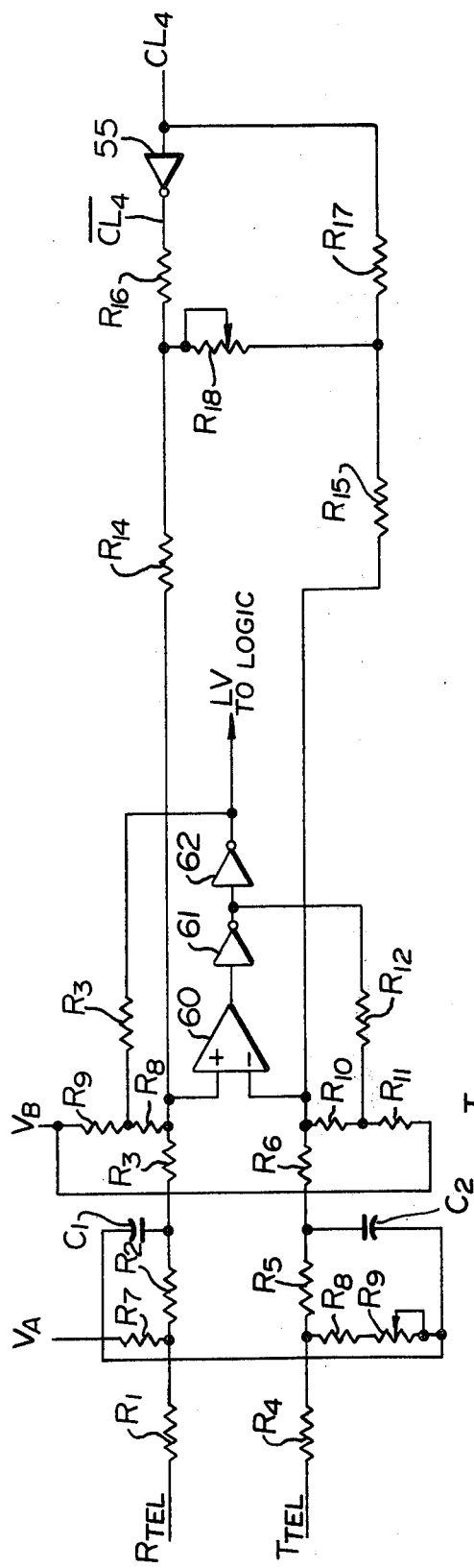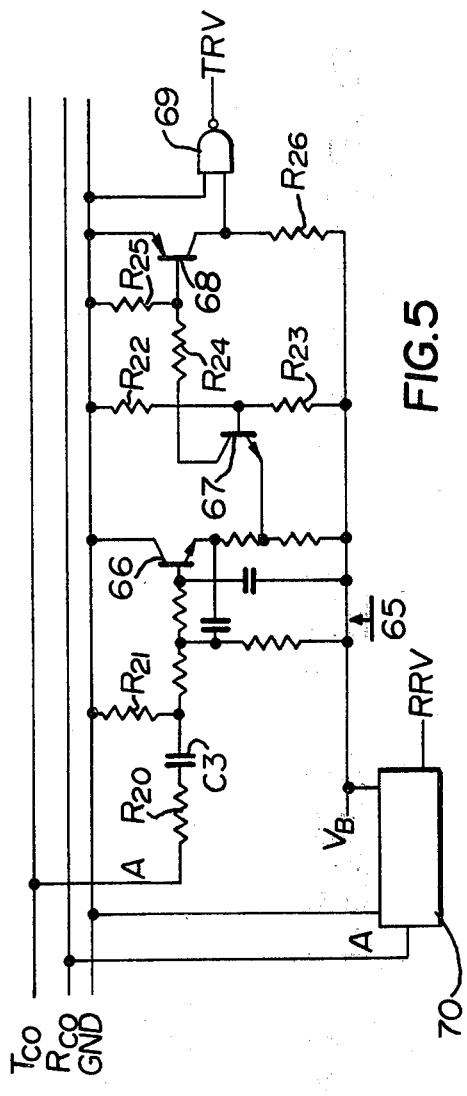
FIG. 4
FIG. 5

PARTYLINE SUBSCRIBER INTERFACE CIRCUIT

This invention relates to a circuit to be interposed between a party line subscriber's telephone set and multi-party line, for simulating the service of private or individual line service as closely as possible, while additionally giving the telephone central office increased control over the subscriber's set. Since such party lines are normally (although not exclusively) found in rural areas, the circuit will be referred to below as a Rural Interface Device (RID).

Multi-party line service in which more than one subscriber is connected to a party line provides telephone service which is less than optimal. Since there are a number of subscriber's telephone sets connected in parallel to a single subscriber's line terminating at a central office, should one subscriber be using his station set, he is usually aware that at any time any of the other subscribers may listen to his conversation merely by lifting their handsets. Lack of privacy is considered to be a major deficiency of party line service.

Special techniques have been developed to restrict access by a potential interrupting party, but these require specialized types of multi-wire party lines such as are available in key telephone systems, or as described in U.S. Pat. No. 4,000,376 issued Dec. 28, 1976 and assigned to Viking Electronics Inc., Hudson, Wisc. For this type of system additional wires must be connected to the subscriber's sets, special subscribers sets must be used. Further, the system does not allow a potential interrupting party to distinguish between a dead line and a call in progress, nor to signal to the parties of a call in progress that an interruption is desired. An emergency break-in to the call is therefore prohibited.

To ring a subscriber connected to a normal party line special signals are sent out from the central office to alert a subscriber of an incoming call. In one type of system, the special signal is a ringing signal having a particular frequency for such party line station set. Selective resonent circuits at the respective party line subscriber's sets allow operation of the local ringer only in the event that the ringing frequency is of the frequency of the selective circuit. In this case, only one ringer is rung of the group of ringers connected to the party line. However, it should be noted that there is the requirement of a special selective circuit for each station set, and therefore a standard station set cannot be used. In addition, a special central office ringing generator is required.

In another type of system, standard station sets are used, but all sets associated with a party line are rung simultaneously. The typically 20 Hz ringing signal is coded in a distinct interruption pattern, and all of the rung party line subscribers are required to mentally decode the ringing code. The subscriber to which the ringing is directed then answers his telephone causing termination of ringing at the central office in the normal manner.

Needless to say, it is a deficiency of party line service to have all ringers of a party line rung as described above, rather than only the ringer of the party to be called, where a standard telephone set is to be used. It is also a deficiency to require specialized individually resonant ringers requiring non-standard telephone station sets.

In the system described in the aforenoted U.S. Pat. No. 4,000,376, all party line telephone sets which contain a ringer are rung simultaneously, and consequently not only is the system non-standard (requiring extra leads), but ringing is non-selective.

In the present invention, only the normal 2 wire tip and ring leads are required between subscribers and the central office, yet the subscribers to a multi-party telephone line (referred to here as a party line) are assured of absolute privacy. Should a party line subscriber wish to make a call while the party line is in use, that subscriber is restricted from access to the telephone line, and has a busy signal returned to his handset. This clearly more closely approximates the situation where, in private line service, a subscriber receives a busy tone when a called line is busy. This is clearly a superior form of service from prior art party line service in which the interrupting subscriber would simply hear the conversation in progress unannounced, once his handset is lifted, thus destroying the privacy of the call in progress, with no indication to the parties of the call that a subscriber may be eavesdropping even unintentionally.

On the other hand one of the party line subscribers may have an emergency call to make, and finds it essential to interrupt the call in progress. Accordingly, the present invention allows purposeful interruption for a predetermined period of time. However, both the interruption and termination of the interruption are signalled by a tone to the subscribers which are parties to the call in progress. During the interruption period the interrupting subscriber may speak and convey the emergency reason for the interruption, which would undoubtedly cause the call in progress to be quickly completed. The interruption period is timed for a period such as fifteen seconds, for example. Accordingly, the parties to the call in progress are given normal privacy as in private line service, but are specifically informed when their privacy has been interrupted, while another party line subscriber is given the opportunity to have access to the line in an emergency situation.

As an additional feature of the invention, the circuit is adapted to allow standard telephone sets with standard ringers to be used, with only a single selected one of the station sets (plus associated extentions if any) connected to the party line being rung. Accordingly the annoyance of the non-intended subscribers of the party line caused by requiring needless attention to ringing codes not intended for them is eliminated.

Should a subscriber wish to make a call while the party line is in use, since the call in progress is given privacy, as noted earlier busy tone is returned to the party wishing service to indicate that the line is in use. After his handset is replaced on the station set, however, his telephone can be rung, once the call in progress has terminated as a signal that the line is idle. This service is not normally extended to private lines, although it is sometimes offered as a special service. The present invention is believed to provide this facility to party line subscribers on an individually selectable basis for the first time.

Rural party line service is often extended to subscribers who wish service through only part of the year, i.e., to summer cottagers for instance. Since the parties to such a party line usually individually request service extended for the entire year, or for parts of the year at different times, it was necessary for the telephone service company to send an installer to the party line subscriber's set location to disconnect it for the period of denial of service. Of course if the subscriber's line was disconnected at the central office, all of the subscribers on the party line would be denied service. The alternative was to leave all party lines in service for the period of the longest station set in service. Needless to say the attendance of a technician to the subscriber's premises is costly, particularly if one must be sent out twice a year, once for connection and once for disconnection. Yet the retention of the line in service to an unoccupied location exposes the line to possible vandalism and damage. Should the line become short circuited, the entire party line appears to the central office as if there is a request for service, and all parties are denied service. Consequently a technician must be sent out frequently to unoccupied premises, and if the owner of the property is not present, it is often difficult to check the local portion of the party line.

Furthermore, termination and transparency tests of individual party line subscribers lines has been difficult, if not impossible to perform from the central office, since there was no way of distinguishing between party line subscriber's individual line portions.

The present inventive circuit, however, allows individual selectable disconnection or connection of any of the subscribers to the party line remotely from the central office. Further, at the time of disconnection or reconnection termination and transparency tests can be made to the subscribers line with certainty of which party line subscriber's line portion is being tested fully. Clearly, this is a significant advance over the prior party line systems which have no provision for selective remote disconnection or reconnection, or selective testing.

All of the above features are provided in a system which allows use of standard telephone station sets, either dial pulse or tone frequency dialed.

Further, the present circuit preferably utilizing CMOS integrated circuit logic allows all of the above features to be provided without requiring a local power source. The entire circuit is powered from the subscribers line, and uses such little current that the central office line relay is not operated unless the local subscriber is off hook. However, should power be lost, as sometimes happens in rural locations, the "connect" or "disconnect" status of the circuit is retained and thus is unchanged when line power is restored.

The power supply should of course be designed to reset the remaining logic with the the restoration of power.

It may therefore be seen that the present circuit allows the provision to party line subscribers of virtually all services normally available to private line subscribers. Yet the services are provided without the major cost of extending separate private subscriber's lines from the central office to each party line subscriber. In addition a substantially reduced cost is attained by for the first time being able to remotely disconnect, reconnect and test the tip and ring leads to the party line subscriber's station sets. Further savings are obtained by the ability to use standard telephone sets, either rotary dial or tone signalled. At the same time there is no significant signal attenuation in the talking path in the invention circuit, nor is there significant unbalancing of the tip and ring leads.

In its most general form the invention is, in a multi-party telephone system, the combination comprising a telephone line for serving a plurality of subscriber station sets, detection means for detecting the busy or idle status of the telephone line, means responsive to the detection means for connecting a station set to the telephone line when the detection means has detected said status as being idle, and means for not connecting the station set to the line but for returning a busy signal to the station set in the event the telephone line is busy.

The system further perferably includes interrupt means for terminating the busy signal and for connection of the station set to the busy telephone line for predetermined period upon reception by the interrupt means of an interruption signal, such as a hookswitch flash generated by the station set. Distinct tones are applied to the line at the beginning and end of the interruption.

The invention also preferably includes ringing decoding means for decoding a predetermined ringing code and for connection of the subscriber's set to the telephone line upon detection thereof, whereupon further ringing signals are applied to the subscribers set.

The invention also preferably includes remote disconnect means for prohibiting connection of any of the subscriber's sets to the telephone line after reception by the remote disconnect means of a remote disconnect signal of a predetermined code signal on the telephone line.

The invention is also, in general, a multi-party telephone system comprising a telephone line for serving a plurality of party line subscriber station sets, and interface means for passing dialing signals identifying one of the station sets from a second station set upon the second station set requesting connection service to the one station set. The interface means is comprised of means for disconnection of the second station set from the telephone line upon receipt of a disconnect signal from the second station set immediately after completing generation of the dialing signals indicating dialing of a revertive call to said one station set, whereby ringing signals from the central office are applied only to the first station set, and for reconnecting the second station set to the telephone line upon the first station set going off hook.

Figure 2:
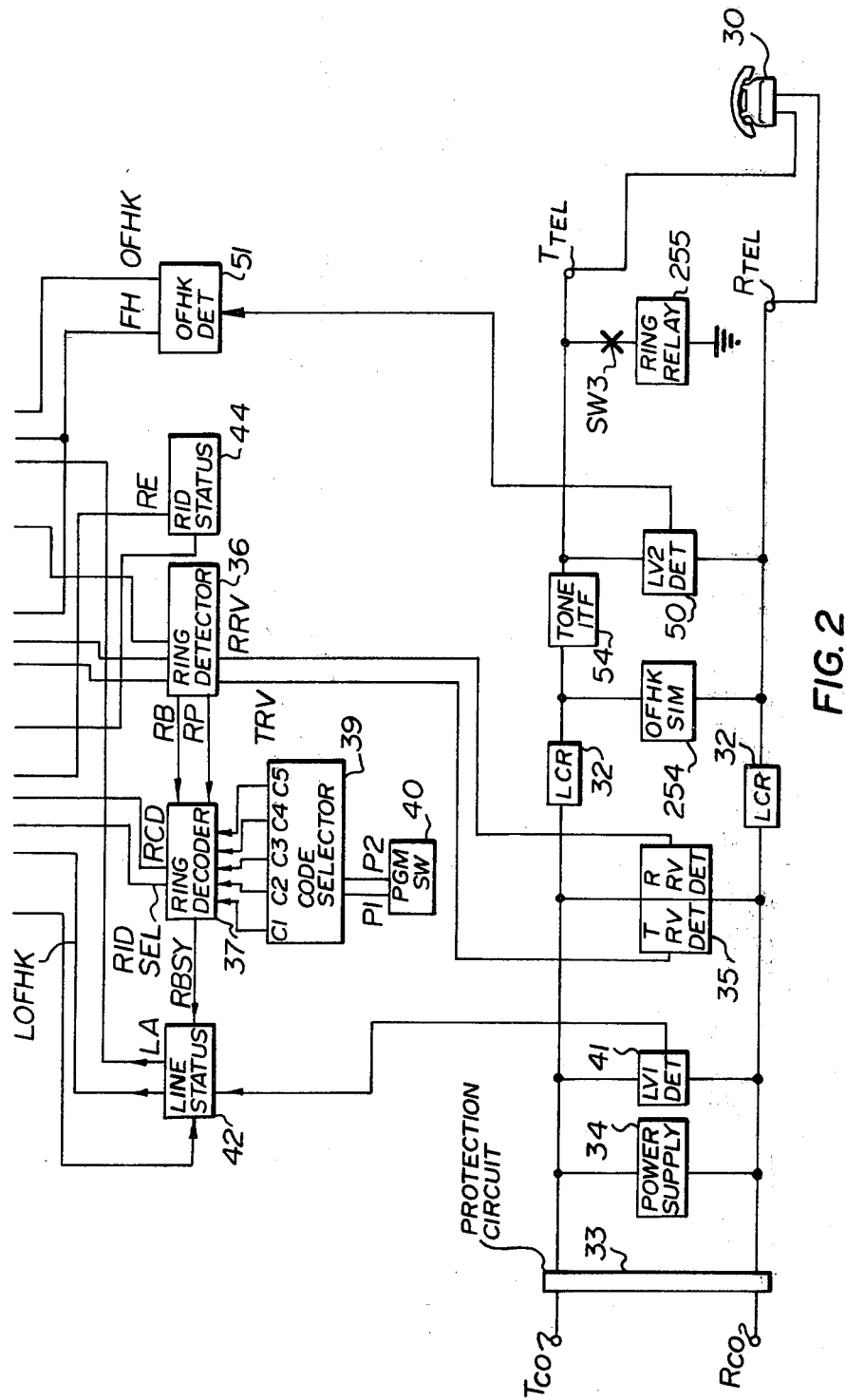
Figure 3:
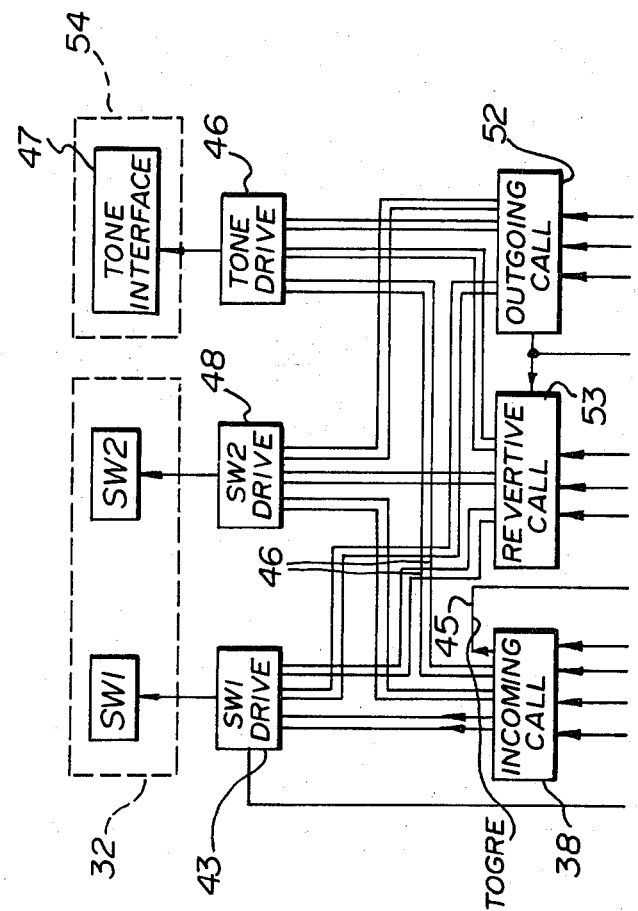
Figure 6:
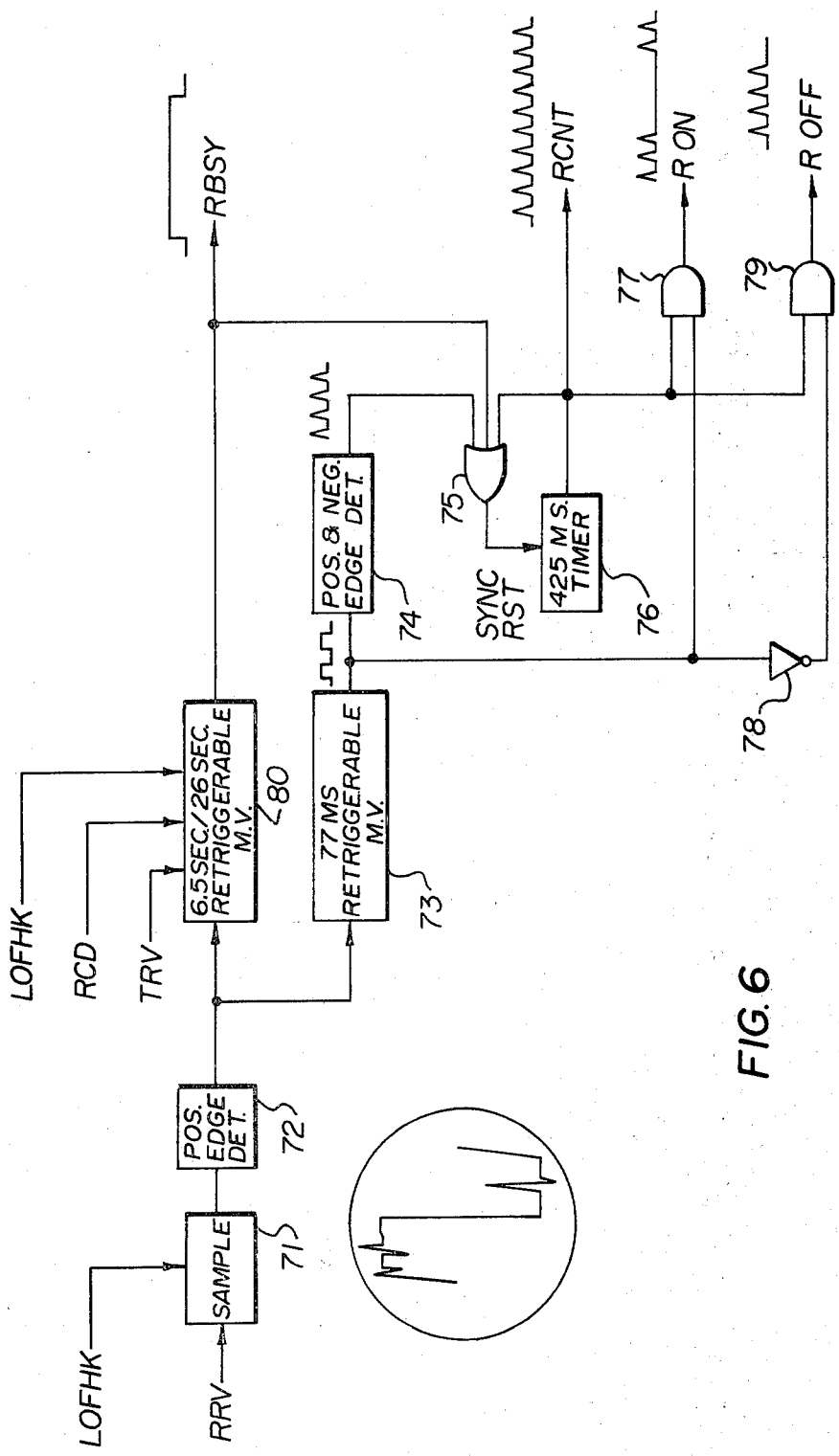
Figure 7:
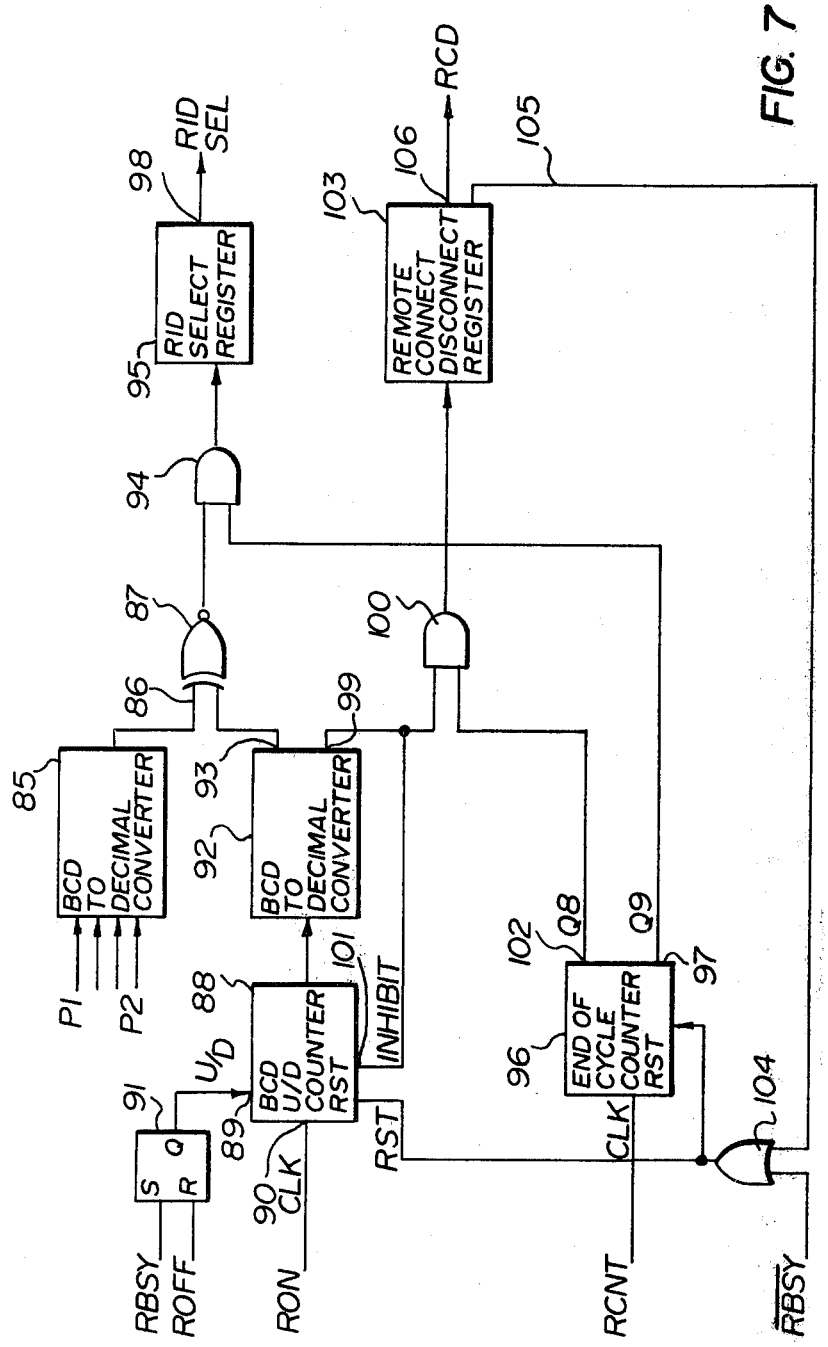
Figure 8:
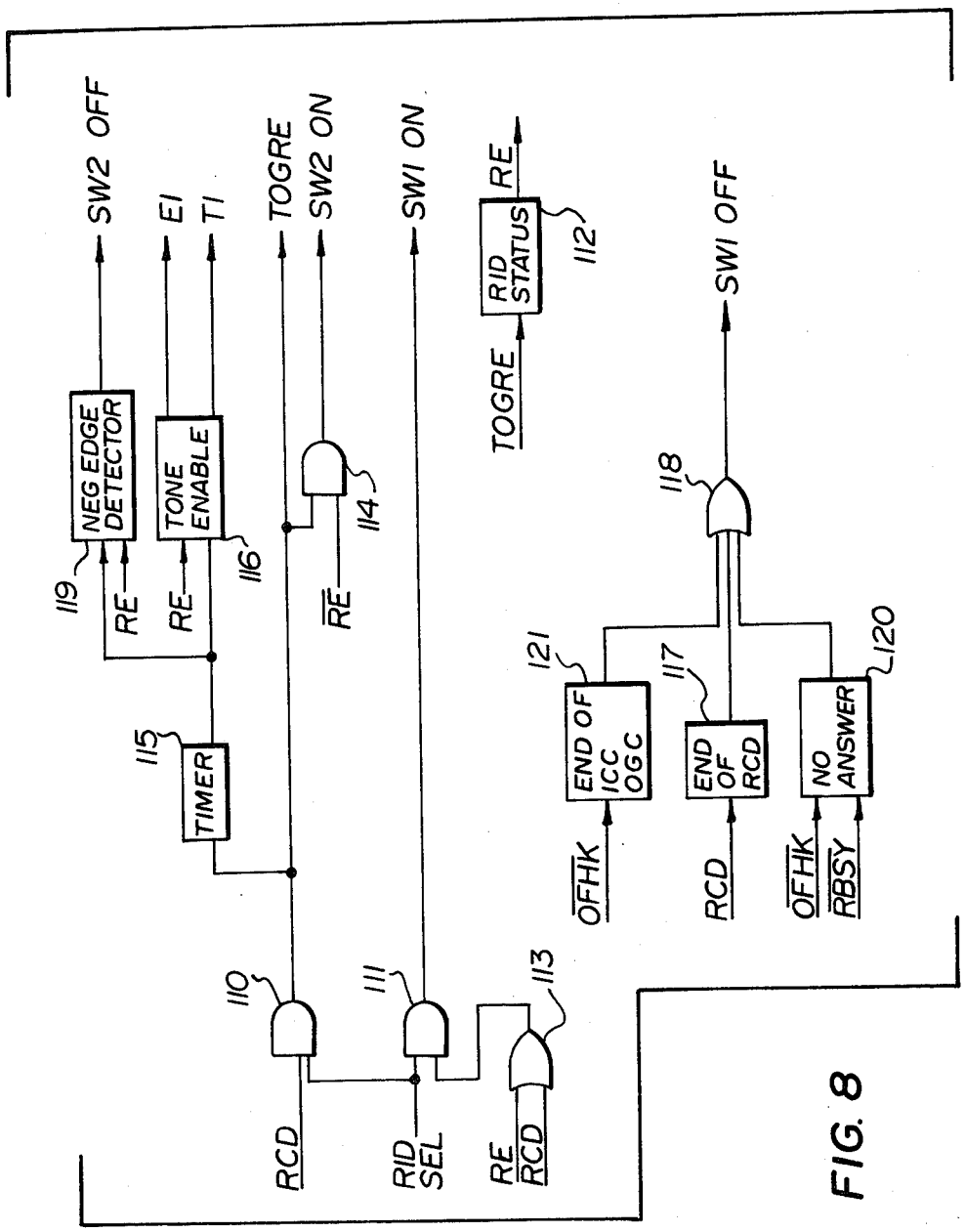
Figure 9:
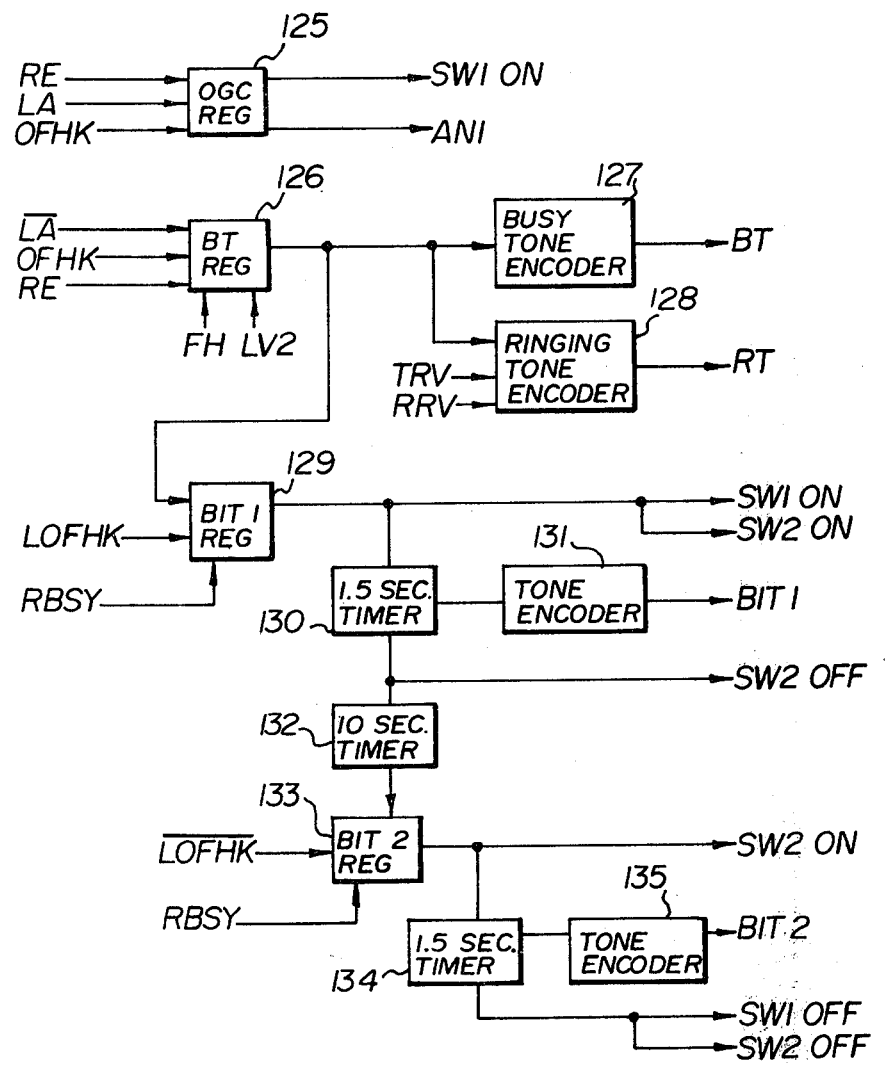
Figure 10:
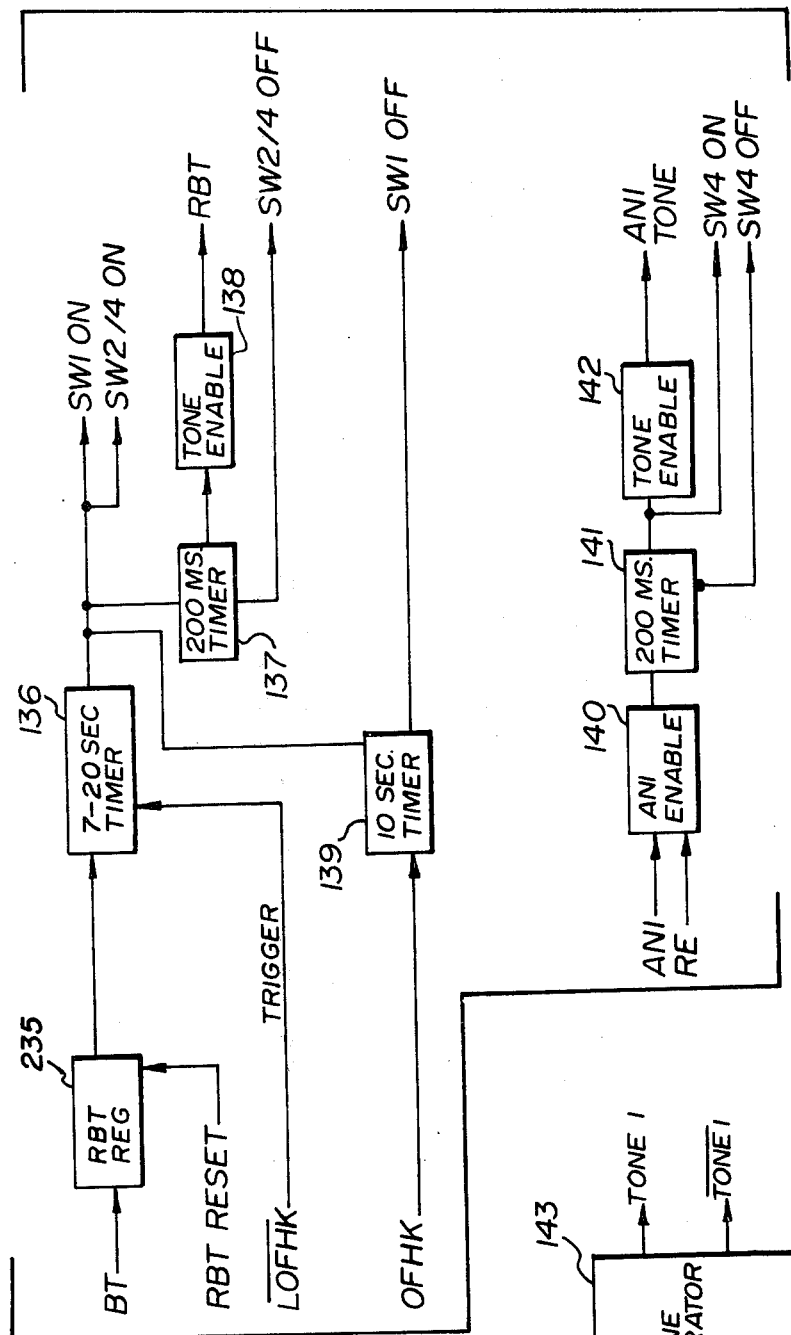

A better understanding of the invention will be obtained by reference to the detailed description below, and to the following drawings, in which:

FIG. 1 is a schematic diagram of the line switching portion of the inventive circuit, FIGS. 2 and 3 placed together form a block schematic of the inventive circuit, FIG. 4 is a schematic of the line voltage detector portion of the circuit, FIG. 5 is a schematic diagram of a ringing voltage detector used in the inventive circuit, FIG. 6 is a logic diagram of the ringing detector portion of the circuit, FIG. 7 is a logic diagram of the ringing decoder portion of the circuit, FIGS. 8, 9 and 10 are logic diagrams of the switch signal deriving portion of the circuit which is connected to the circuit of FIG. 7.

Figure 11:
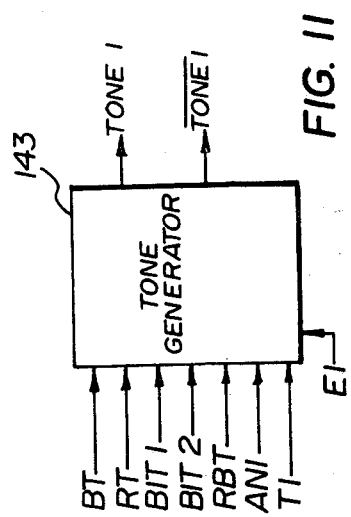

FIG. 11 is a block schematic of the tone enable portion of the inventive circuit.

The detailed description below is organized as follows to facilitate understanding of the structure and operation thereof. A description is first given of the line switching portion of the circuit which is shown in FIG. 1, since reference is made later to various switches and components thereof. With reference to FIGS. 2, and 3, a general description of the structure and operation of the invention is then given corresponding to different kinds of telephone calls. Once the pertinent types of calls have been described, the blocks of FIGS. 2 and 3 and their interrelationship will be understood. Finally, a detailed description of the structure and operation of each of the blocks is given.

It should be noted that a RID circuit as described herein is connected in the subscriber's line, either within or just outside the subscriber's premises. The description below is made with reference to a single RID circuit, as it operates and interfaces with the other RID circuits of the party line, the central office, and the local subscriber's set or sets.

LINE SWITCHING CIRCUIT

Referring now to FIG. 1, a telephone line is shown comprised of a tip lead and a ring lead. The ends of the ring and tip leads for connection to the subscriber's set are the shown as $R_{TEL}$ and $T_{TEL}$ respectively, and the corresponding lead portions for connection to the central office are shown as $R_{CO}$ and $T_{CO}$.

Connected in series with the tip and ring leads are switches $SW1_R$ and $SW1_T$ respectively which are the contacts of magnetic latching relays 1 and 2 respectively. The relay coils are connected in parallel and to a pair of conductors, one of which is connected to means for applying a SET pulse to operate both relays. Upon operation, switches $SW1_R$ and $SW1_T$ magnetically latch closed. The other conductor is connected to means for applying a RESET pulse. Once applied, the RESET pulse causes switches $SW1_R$ and $SW1_T$ to be held open. The magnetic latching relays can be reed relays.

Switches $SW1_R$ and $SW1_T$ are the main line switches which connect or disconnect the telephone set from leads $R_{CO}$ and $T_{CO}$, the latter of which are connected directly to the other individual subscriber's lines of the party line.

Of couse rather than the two relay coils 1 and 2 a single relay coil can be used to switch both switches $SW1_R$ and $SW1_T$ on magnetically; a dual switch single coil relay is preferred.

The relay switch contacts are protected by individual metal oxide varistors 3 and 4 which are respectively connected across the contacts $SW1_R$ and $SW1_T$. The varistors protect the relay contacts against voltage surges, and the low leakage nature of the varistors ensures that virtually no line current will be drawn when the aforenoted switches are open.

Preferably the relay coils are operated by CMOS drivers 5 and 6.

A bias leakage current is applied to the subscriber's set when switches $SW1_R$ and $SW1_T$ are open, in order that an off hook detector, to be described later, should have a reference from which to work. Series resistors 7 and 8 are connected across switch $SW1_R$ and series resistors 9 and 10 are connected across switch $SW1_T$. The tap between each of the pairs of series resistors are connected to ground or reference voltage $V_A$ via capacitors 11 and 12. The resistance values of resistors 7, 8, 9 and 10 are such as to cause a leakage current preferably no more than 200 microamperes to flow depending on the line voltage across leads $R_{CO}$ and $T_{CO}$.

In series with one lead, such as the ring lead, a small valued resistor 13 of, say, 20 percent of the D.C. resistance of the subscriber's telephone set is connected. An audio driver circuit 14 of well known push-pull form has an output transformer 15 which has its secondary winding connected across resistor 13. Complementary input signals TONE 1 and $\overline{\text{TONE 1}}$ are applied to the input of the driver circuit 14.

The primary of output transformer 15 has a pair of back to back diodes 20 and 21 connected thereacross to protect transistors 16 and 17 of the driver 14 from return voltage spikes from the transformer. These may be zener diodes for the purpose of limiting the maximum signal applitude across the primary winding due to excess current in the secondary winding.

It is preferred that the transformer winding ratio be such that there is current, rather than voltage gain in the transformer 15, so that the push-pull circuit is not overloaded. Typically the output terminals of the transistor circuit should be loaded to about 60K ohms. The output transformer practically may have an impedance ratio of 20K ohms/8 ohms, the output winding thereof being connected through back-to-back series capacitors 22 and 23 (for non-polarization) across resistor 13.

Also connected across resistor 13 are series resistors 24 and 25, each of value approximately double the subscriber's off hook DC resistance. The junction of resistors 24 and 25 is connected through a switch $SW_2$ to the tip lead $T_{TEL}$. Switch $SW_2$ is the make contact of a magnetic latching reed relay 26.

A further protective varistor 27 for switch $SW_2$ can be connected between leads $R_{TEL}$ and $T_{TEL}$ for the $SW_2$ side of switches $SW1_R$ and $SW1_T$.

In operation, the subscriber's telephone set is normally isolated from, but can be connected to the party line leads $R_{CO}$ and $T_{CO}$ by applying a SET pulse to CMOS driver 5. Relay coils 1 and 2 will operate, closing switches $SW1_R$ and $SW1_T$. The calling subscriber may then dial or key multifrequency dial tones designative of the called party.

Should the party line be in use, in a manner to be described in more detail, busy tones are applied to audio driver 14, which are amplified, translated via output transformer 15 and applied across resistor 13. Relay coils 1 and 2 are not operated, keeping $SW1_R$ and $SW_T$ open, but relay 26 is operated, closing switch $SW_2$. Accordingly, a circuit exists from lead $R_{TEL}$, through resistor 13 which is in parallel with the source of tone 14, through resistors 24 and 25 in parallel, switch $SW_2$, to lead $T_{TEL}$. The busy tone is therefore heard in the subscriber's handset, informing him of the busy state of the party line. At the same time he is isolated from the $R_{CO}$ and $T_{CO}$ leads, maintaining the service of the call in progress. When the subscriber's station set goes on hook other circuits cause discontinuation of the tone and opening of switch $SW_2$. It should be noted that switch $SW_2$ effectively inserts a termination to the line. Therefore it is preferred to close $SW_2$ only during tone present conditions. Since busy tone is an interrupted tone, during the interrupts switch $SW_2$ is activated to an open "on hook" condition.

It should be noted that operation of relays 1, 2 and 26 is by application of a SET or RESET pulse. As the relays are magnetically latched, further application of power to maintain their state is not required.

The tones applied by driver 14 can of course be ringing tones, busy tones, barge-in tone, modulated ringing tone mixed with busy tone, automatic number identification (ANI) tones or other special tones.

Turning now to FIGS. 2 and 3, tip and ring leads $T_{CO}$ and $R_{CO}$ are shown which lead to a central office and the other party line subscribers lines, as well as $T_{TEL}$ and $R_{TEL}$ which lead to the subscriber's set. A subscriber's telephone set 30 is connected across the tip and ring leads $T_{TEL}$ and $R_{TEL}$. The switches $SW1_R$ and $SW1_T$ are generally shown as part of circuit blocks 32, labelled LCR (line connect relay). Switch SW2 is part of the offhook simulation circuit 254, connected across leads $T_{TEL}$ and $R_{TEL}$.

Connected across the $T_{CO}$ and $R_{CO}$ leads is a surge protector 33 of well known construction, and a power supply 34. The power supply derives the various voltages required for the CMOS circuitry from the subscriber's line and as such provides both a regulated source of operating current for the circuitry of the RID, and as well indicates the initialization of power to logic reset circuitry, in case of an interruption.

Both the structure and operation of the invention will become evident in the following description of various types of calls.

INCOMING CALL

In the event of an incoming call, with the party line idle, all RID circuits will be idle (and assumed active, i.e. prepared to extend calls through to the subscriber). The aforenoted switches $SW1_R$, $SW1_T$ and SW2 are open, in an idle condition. Ringing current from the central office at 20 Hz appears on the tip and ring leads $T_{CO}$ and $R_{CO}$.

Ringing voltage detector 35 is connected to the tip and ring leads (and to ground) to detect the 20 Hz ringing voltage. This is connected to a ringing detector 36.

It should be noted that normal central office party line ringing has ringing voltage applied between tip and ground or between ring and ground. In one form of selective ringing four party line subscribers can be accommodated by use of a polarized connection of the ringer to either tip or ring leads and ground for receiving the polarized ringing voltage. This is another case of non standard telephone being required in the prior art. The ringing voltage detector is therefore of the kind shown split into tip and ring detector portions TRV and RRV respectively, each individually connected to ring detector 36, and preferably is also connected to ground during the reception of ringing, to reduce the ringing voltage return lead resistance loss. In FIG. 2, switch SW3 closes to connect a ring relay 255 to ground.

The ring detector 36 samples the signal detected by ringing voltage detector 35 and through time referencing circuits, determines that the voltage is in fact ringing voltage, of 20 Hz frequency. Pulses are generated and applied on an RP lead to a ring decoder circuit 37, and the detector also applies a signal following the envelope of the ringing voltage on an RB lead to the ring decoder 37.

The ring decoder 37 has a code selector 39 connected to it, which causes the ring decoder to provide a high level signal on a RID SEL lead connected to incoming call logic circuit 38 if the ringing code which has been detected and decoded matches that of the present RID, as predetermined in code selector 39.

The code selector 39 has five output leads C1, C2, C3 C4 and C5 which can set the ringing decoder to respond to one of a number of combinations of party ringing codes. Connected to the code selector circuit 39 are program switches 40 which can be preset manually to distinguish the RID ringing code in conjunction with the code selector.

The ring decoder also provides an output on an RBSY lead to a line status circuit 42, which indicates to the RID that ringing is occuring. The high level signal on the RBSY is present during and for a time period following each ring burst, to mask the gap between ring bursts.

An enabling high level signal on the RIB SEL lead of the ring decoder is applied to incoming call logic circuit 38. An enabling pulse is applied to SW1 drive circuit 43 from logic circuit 38 which operates the set input of relay coils 1 and 2 to connect the subscriber's set from leads $T_{TEL}$ and $R_{TEL}$ through switches $SW1_R$ and $SW1_T$. This will occur provided appropriate checks have been made of the idle status of the line. Ringing voltage can now be fed directly from the central office to the telephone set ringer.

A RID status circuit 44 is provided to store the active or inactive status of the RID. Assuming that the ringing code has been determined as being for the associated subscriber, there will be a pulse on the RID SEL lead. An output RE lead from the RID status circuit 44 designates the status of the RID. Should the RID be active, a RID enable high level signal on an RE lead from the RID status circuit 44 is applied to the incoming call logic 38 allowing it operate, to close $SW1_T$ and $SW1_R$ to allow the call to proceed.

With the incoming call logic 38 thus aware that the ringing code is for the local subscriber and that the RID is active, switches $SW1_T$ and $SW1_R$ are closed by SW1 drive circuit 43.

Further coded ringing from the central office then activates the ringer of station set 30. Accordingly one series of ringing bursts forming a coded ringing cycle is used to establish the identity of the local subscriber and is absorbed, and additional following series of ringing bursts is passed to the subscriber's station set.

Should the subscriber not answer, the ringing is terminated in the normal way from the central office, when the calling party hangs up. At that point the ring burst envelope signal from ring detector 36 disappears as well as the ring busy signal on the RBSY lead to the line status circuit 42. The incoming call logic 38 causes the switch drive to apply a reset pulse to relays 1 and 2, causing the opening of switches SW1. The RID circuit is thereby returned to the normal idle condition. If the local subscriber answers the ringing, a line voltage detector 41 senses this and activates the Line Status circuit 42, and a resulting signal on its output LOFHK lead causes the SW1 switches to remain closed (while the central office has been signalled to stop ringing) until the line status circuit 42 has an indication from line voltage detector 41 that the subscriber's line has returned to an idle status, i.e. due to the call having been completed.

OUTGOING CALL

To initiate an outgoing call, the handset of the subscriber's set 30 is lifted off hook. The LV2 line voltage detector 50 detects, by measuring the voltage across leads $T_{TEL}$ and $R_{TEL}$ which is present due to current leakage through resistors 7, 8, 9 and 10 (FIG. 1), the off hook condition at the telephone set and this is sampled by the off hook detector 51. When a predetermined number of successive samples are at low voltage level, an off hook OFHK signal is applied from the off hook detector 51 to outgoing call logic circuitry 52. (A fewer number of samples establish that the off hook condition is a hookswitch flash). A normal off hook condition is interpreted as a request for service, and signals on the leads from the outgoing call logic circuit 52 to the SW1 drive circuit 43 cause the SW1 switches to be closed. The subscriber may then dial an outgoing call in the normal manner. At the end of the call, switches SW1 are released in a manner similar to the end of an incoming call described above.

In the event the subscriber had lifted his handset off hook and the party line is in use, line voltage detector 41 will have detected the low voltage across the $T_{CO}$ and $R_{CO}$ leads, causing the line status circuit 42 to indicate that the line is not available. This is marked by a low level signal on the LA lead which is connected to the outgoing call logic circuit 52. Since the line is not available, service is denied to the subscriber.

The outgoing call logic 52 therefore causes the operation of the SW2 drive circuit 48 and tone drive circuit 46 to close the SW2 switch and apply busy tone to the local subscriber in a manner described earlier with reference to FIG. 1.

PRIVACY AND PRIVACY INTERRUPT

Should the subscriber's line be in use at the time the local subscriber wishes to call, the voltage across $T_{CO}$ and $R_{CO}$ is low, the line connect relay 32 for its SW1 switches open circuited. This is the case at all RID stations except the one of the call in progress. Assume not that the local subscriber, for instance, once gone off hook has initiated a flash, the outgoing call logic 52 proceeds to operate the tone drive 46. An interrupt or "barge-in" tone is thus generated, and the line connect relay 32 is operated by drive circuit 43 to close switches SW1.

The barge-in tone is applied for a preset time, such as 1.5 seconds, and at the end of the tone switch an approximately 12 second timer is started. After the end of the 12 second period a second short period barge-in tone of different (terminating) frequency is enabled after which switch SW1 is opened. During the 12 second as well as the tone periods, the line connect relay 32 has switches SW1 closed, allowing communication between the interrupting party and the parties of the call in progress. The barge-in tones have specifically indicated to the parties of the call in progress the beginning and end of the interruption. Of course the respective tones could be distinguished by, for instance, bursts of tone, such as 3 bursts of ¼ second each.

After the second barge-in tone has terminated by a time-out of about 1.5 seconds, contacts SW1 of switch 32 are opened, cutting off access to the party line by the local subscriber.

Should the call in progress have been terminated during the interruption period, once the local subscriber has gone on hook, the subscriber's line reverts to high voltage, and line voltage detector 41 detects an idle condition. The RID is thus reset to an idle condition. The local subscriber may not initiate his originating emergency call.

AUTOMATIC RING BACK

A special feature may be offered to the local party line subscriber using this inventive circuit which notifies the local subscriber, after going temporarily off hook to a busy line, when the busy line becomes idle. A memory in the outgoing call logic 52 retains recognition that the local subscriber had requested service and that the line status was busy at that time.

Upon termination of the call in progress, the outgoing call logic 52 causes switches SW1 to close and the tone drive 46 to apply a short frequency shift keyed ringback tone signal to the central office. A circuit at the central office senses the tone as having originated from a particular RID circuit, and applies a short burst or ringing voltage to the subscribers line, which traversed closed switches SW1.

The short burst of ringing causes the ringer at the subscriber's set 30 to operate, informing the subscriber that line is idle and that he may now initiate an outgoing call. After a short time out period the line connect relay 32 releases, if the local subscriber has not gone off hook.

In case more than one party line subscriber had gone off hook to the busy line, a waiting period of a random length of time (e.g. up to 20 seconds) at each RID before the outgoing call logic causes the ring back tone to be generated prevents the simultaneous generation of ringback tones from more that one RID circuit.

REMOTE DISCONNECT—RECONNECT

As was noted earlier the local subscriber can be disconnected or reconnected remotely from the central office, and thus can be denied service. Any of the subscribers connected to the party line can be disconnected. At the time of the disconnection or reconnection, the subscriber's line can be selectively tested.

A RID disconnect (or reconnect) signal is applied to the party line by the central office and consists of a long preliminary ring of longer than six seconds followed by the ringing code of the particular subscriber to be disconnected (or reconnected). The RID circuit changes to a disconnect condition after returning an acknowledgement tone to the central office and then allowing a test of the line to be made from the central office. The subscriber is thereby denied service. The central office can, at a future time, render the RID active, extending service to the local subscriber by again sending a long burst of ringing followed by the appropriate ringing code of the subscriber. A return acknowledgement tone of different frequency is again sent to the central office, the RID is rendered active and a time period is set during which testing can be done from the central office. The line connect relays 32 at this time are operated allowing test of the local subscriber's station set to be effected. The line connect relay 32 is then released.

In this method, assuming the line is idle, the transmission of a disconnect signal as described above is sensed by the ringing voltage detector 35 and is translated by the ring detector 36 to a ring burst envelope and pulse signals as described later, which are applied to the ring decoder 37. These signals are decoded and a high level signal is applied on the RCD lead (due to the long ringing burst) as well as the RID SEL lead. A signal also appears on an RBSY lead from the ring decoder to the line status circuit 42 for a long period, such as 26 seconds, to set the status to a "line busy" indication. This period is used for line testing by the central office.

The incoming call circuitry 38 then causes the SW1 drive circuit 43 and SW2 drive circuit 48 to operate relays 1, 2 and 26 (See FIG. 1). Tone drive circuit 46 is then also activated and the tone interface circuit 47 causes the application of tone to the line via push pull circuit 14 as described earlier. The tone is thus returned via the closed contacts of SW1 to the central office, acknowledging receipt of the disconnect signal. The tone is caused to operate for a short period, typically 1.5 seconds, and is enabled by a timer in the incoming call logic circuit 38.

Once the timer has timed out, the acknowledgement tone is stopped but switch SW2 is retained closed.

With a ring busy signal applied to the RBSY lead from ring decoder 37, causing the line status circuit 42 to cause the incoming call circuit 38 to keep switch SW1 closed following the acknowledgement tone, the central office can perform normal transmission and noise tests on the line, since the line has been terminated through SW2 in place of the station set being off hook. Switch SW2 remains closed during the entire time that the RID is in its disconnect status. Following expiry of the timed long (say 26 second) testing period, the ring busy signal on the RBSY lead is removed from the line status circuit 42, resulting in the opening of the SW1 switches by the application of the reset signal to relays 1 and 2.

It was noted that upon receipt of a long disconnect ringing pulse followed by the ringing code of the local RID circuit, a signal appears on the RCD and RID SEL leads from the ring decoder 37 leading to the incoming call logic 38. The incoming call logic causes a toggling signal to be applied to the RID status circuit 44, which retains memory of the active or inactive state of the RID circuit. In the active state a high level signal appears on the RE (RID enable) output lead of the status circuit 44, and the RE lead carries a low level signal when the RID is inactive, at which time service is denied to the local subscriber.

Once the testing has expired, the incoming call logic, having a high level signal applied on the RE lead from the RID status circuit 44 causes the SW1 drive circuit 43 to release the SW1 switches. Since the SW2 switch is retained closed, the local subscriber's station set 30 is terminated and is therefore quiet. Yet the $T_{CO}$ and $R_{CO}$ leads to the central office are open circuited. Due to the signal on the RE lead of RID status circuit 44, further incoming calls will not cause the RID to respond. However upon receipt of a long reconnect signal followed by the local subscriber's ringing code, the RID status circuit 44 is toggled, allowing the RID circuit to respond in a manner similar to the RID disconnect sequence, forwarding an acknowledgement tone to the central office, releasing SW2, and after a timed testing period, releasing the SW1 switches which had operated to allow the central office testing.

It should be noted that with the RID in its active reconnect status just after receipt of the reconnection signal and ringing code, switch SW1 is closed for about a 26 second period. Tests for the presence of telephone set ringers on the line at the telephone set 30 can be done during this period.

REVERTIVE CALL

Should the local subscriber wish to call another subscriber on the same party line, after dialing the digits, he flashes his hook switch. A timer within the off hook detector notes the short on hook period of the flash and applies a signal to an FH lead, which is connected to the outgoing call logic circuit 52 as well as to a revertive call logic circuit 53. The revertive call logic circuit is connected to the SW1 and SW2 drive circuits 43 and 48. Since the SW1 drive had caused the line connect relays 32 to be closed to accommodate dialing of the called number to the central office, the SW1 drive is caused to open line connect relays 32 to open the line and to disconnect the calling subscriber therefrom upon reception of the hook switch flash. This therefore simulates the appearance to the central office of an idle condition on the party line even though the local subscriber is off hook. The central office will now ring the called party on the party line. The revertive call circuit 53 also causes SW2 drive 48 to close switch SW2 (as noted in FIG. 1), and also actuates tone drive circuit 46 to apply ringing tone to the local subscriber. Ringing tone is then applied to the calling subscriber's tip and ring leads, with a complete circuit being provided through switch SW2, earlier noted as being within the tone interface circuit 54 connected in series with the tip and ring leads as will not be described.

The ringing tone to the local calling subscriber is triggered by the detection on the party line by local subscriber's RID circuit of ringing on the line by ringing voltage detector 35. This detected signal is applied to the ring detector 36 which applies a signal to the revertive call logic circuit 53. The revertive call logic circuit having been actuated by a signal on the FH lead of the off hook detector 51 caused by the hook switch flash, then enables the tone drive circuit 46 to apply ringing tone in a manner described with reference to FIG. 1 to the leads $T_{TEL}$ and $R_{TEL}$ in step with the ringing voltage applied by the central office. Since the ringing code is different than the one associated with the calling subscriber, the local RID ring decoder 37 will decode the signal as not applying to the present telephone set and will disregard it.

When the called party answers, the line voltage detector 41 detects a change in voltage level across the $T_{CO}$ and $R_{CO}$ leads, causing operation of the incoming call logic circuit 38 and the SW1 drive circuit 43 to close the line connect relay 32 as discussed earlier. Ringing tone is stopped upon detection of the change in voltage level, and with the speech path established, the call may progress.

Having now described the structure and operation of the invention in block diagram form, a detailed description follows below concerning the specific circuitry used in each of the blocks.

LINE VOLTAGE DETECTORS

The LV1, LV2 line voltage detectors 41 and 50 shown as a block in FIGS. 2 and 3 are shown in detail on the circuit in FIG. 4. A CMOS buffered programmable operational amplifier 60 is used as a major active element of the detector, and has its output connected to a series of two CMOS inverters 61 and 62. The lead carrying the output signal of inverter 62 is designated as LV.

The input terminals of operational amplifier 60 are connected via series resistors R1, R2 and R3 to the $R_{TEL}$ lead and via series resistors R4, R5 and R6 to the $T_{TEL}$ lead respectively. The $R_{TEL}$ and $T_{TEL}$ leads were described earlier as being connected to the subscriber's telephone set 30.

The junction of resistors R1 and R2 is connected via resistor R7 to a source of potential $V_A$ or to ground. Similar valued capacitors C1 and C2 are connected from the source of voltage $V_A$ or ground respectively to the junction of resistors R2 and R3, and the junction of resistors R5 and R6.

The resistors network so far described should be balanced in value, i.e., the values of resistors R1 and R4 should be similar, and the resistance of resistor R7 similar to the total value of resistors R8 and R9. Resistors R9 is preferably in the form of a potentiometer in order that it can be adjusted to an exact balancing resistance with resistors R8, to resistor R7. Further, the resistance values should be high in order that only a small amount of current be drawn from the tip and ring leads; for instance, the total resistance of resistors R1, R2 and R3 in series typically should be over 3 megohms. The ratio of resistor R7 to R1 provides the proper attenuation of the input signal to meet the DC power limits of the operational amplifier 60.

It is important to minimize comon mode interference and therefore the resistor network should be optimally balanced. Consequently the resistors preferably should have one percent or better tolerance. Potentiometer R9 should be adjusted to correct any remaining unbalance.

The value of capacitors C1 and C2 with the resistors in the network should be such that there is approximately ten milliseconds delay of input signal which appears to the tip and ring leads. This affords a substantial 60 Hz common mode signal reduction, and thus acts as filter for 60 Hz line frequency signals. The capacitors should also be of 1% tolerance to maintain AC balance.

The operational amplifier 60 and inverters 61 and 62 are connected in a toggling mode. Series resistors R8 and R9 are connected between one input lead to a source of voltage VB and series resistors R10 and R11 are connected between the other input and voltage VB in order to set the bias at the mid range of $V_B/V_A$. The output terminal of inverter 61 is connected via resistor R12 to the junction of resistors R10 and R11 and the output terminal of inverter 62 is connected via resistor R13 to the junction of resistors R8 and R9. Resistors R9 and R11 should be of similar value and resistors R8 and R10 should also be of similar value, approaching, for example, ½ megohm. These resistors also preferably are of one percent tolerance to retain balance. The identically valued feedback resistors R12 and R13 are preferably values of between 5 and 6 megohms. This network is adjusted to set the bias and connect the offset voltages of inverters 61 and 62.

Due to leakage current purposely introduced via resistors 7, 8, 9 and 10 (FIG. 1) from the telephone line leads $R_{CO}$ and $T_{CO}$ connected to the telephone switching office, the local subscriber's telephone set being on hook will result in a DC voltage across terminals $R_{TEL}$ and $T_{TEL}$ for instance above three volts.

However, should the local telephone set be in an off hook condition, typically the voltage across $R_{TEL}$ and $T_{TEL}$ leads will be very low, for instance, 0.01 volts. The changing reference causes the Schmitt trigger formed by operational amplifier 60 and inverters 61 and 62 to toggle.

An input signal is also applied to the input terminals of operation amplifier 60 via similarly valued resistors R14 and R15, which should be of similar vaue to resistors R8 and R10. The signal is obtained from a clock source CL4 which is applied to one input of an inverter 55. The voltage across the inverter, and therefore its output voltage is controlled by series resistors R16 connected to its output, R17 connected to the same clock signal source CL4, and potentiometer R18 which is coupled between the junctions between resistors R14 and R16, and R15 and R17.

As an example for the LV1 detector 41 assume that the peak to peak square wave voltage of clock source CL4 is approximately three volts. Potentiometer R18 is adjusted to provide a square wave voltage to resistors R14 and R15 measured across potentiometer R18 of two volts. Accordingly the DC voltage sensed across the $R_{TEL}$ and $T_{TEL}$ leads must be as low as or less than two volts for toggling of the trigger formed by operational amplifier 60 and inverters 61 and 62 to occur. An output signal on the LV lead which is connected to line status circuit 42 is present when the voltage sensed across the telephone line is less than two volts. It is believed clear, therefore, that the threshold of the input signal of either polarity less than which an output signal will occur is set by the potentiometer R18.

As noted earlier it is preferred that the resistors chosen and the input impedances of the active elements should be of relatively high value for very low current consumption, in order that all required current required by the circuit may be powered from the telephone line leads $R_{CO}$ and $R_{CO}$, yet without operating the central office line relay or affecting the line transmission and control characteristics. The active elements should also be of low current consumption during operation, and therefore the operational amplifier for example is preferrably a CMOS programmable operational amplifier programmed to draw less than 10 microamperes.

The LV2 line voltage detector 50 structure and operation is identical to that described above, but with the difference in the adjustment of potentiometer R18 setting a different (low level) threshold of toggling.

Accordingly a higher and lower detection threshold for the LV1 and LV2 is easily set, and the level of the voltage on the tip and ring leads of the telephone line both on the subscriber's station set side of the RID ($T_{TEL}$ and $R_{TEL}$) and on the central office side ($T_{CO}$ and $R_{CO}$) of the RID can be detected. An output logic signal on the LV1 or LV2 lead is provided either above or below the detected thresholds for processing by the logic circuitry.

Returning now to FIG. 1, the LV2 voltage sensor 50 of the type just described with respect to FIG. 4 is shown as block 64 connected across the tip and ring leads. The clock lead input CL4 is shown as lead CLK, and the LV lead output is labelled OUTPUT.

RINGING VOLTAGE DETECTOR

FIG. 5 shows a schematic diagram of a preferred form of ringing voltage detector 35 for use in this invention.

The tip lead ringing detection portion of the circuit has a resistor R20 connected in series with a capacitor C3 to the tip lead, to the input of a low or band pass Sallen and Key filter 65 which is adapted to pass 20 Hz ringing signals, but to attenuate common mode signals of 60 Hz, which are superimposed on the 20 Hz ringing signals. A resistor R21 is connected between capacitor C3 at the input to the filter to a ground lead (GND) to set the degree of attenuation of the stop band portion of the filter characteristics. The active element of the filter, transistor 66, has its emitter follower load resistor connected to the emitter of NPN transistor 67. While the filter circuit is shown for the sake of completeness, it will not be described further as it is considered to be within the expected skill of a person skilled in the art.

The base of transistor 67 is biased from the top of a voltage divider comprising resistors R22 and R23 which are connected between ground and a potential source VB. The collector of transistor 67 is connected through resistor R24 to the base of PNP transistor 68, which has a bias resistor R25 connected to the ground lead. The emitter of transistor 68 is also connected to the ground lead GND, and its collector is connected via resistor R26 with resistor R23 and the common point of the Sallen and Key filter 65 to the source of voltage VB. The collector output of transistor 68 is connected to one terminal of a CMOS buffer 69. The output of the ring voltage detector is obtained from the output of buffer 69.

In operation, ringing voltage is applied between the tip and ground leads at the central office for a tip party subscriber. The signal passes into the circuit via the lead designated as A, and passes through the DC decoupling circuit comprising resistor R20 and capacitor C3, and resistor R21, and then passes through the active Sallen and Key filter 65, which as noted above is a low or narrow band-pass filter passing the 20 Hz ringing voltage. Typically, for example for 100 volts RMS 60 Hz, common mode signals can be attenuated by about 20 dB to allow reliable detection of 20 Hz ringing in the ringing voltage, which in the present design has a 30 volt RMS threshold.

Resistor R20, capacitor C3 and resistor R21 comprise a voltage divider. When the 20 Hz ringing voltage is of negative polarity in excess of a predetermined thresholds, transistor 67 is caused to turn on; the threshold of operation of transistor 67 is set by the ratio of the resistors R22 and R23 connected to its base. Ringing voltage over a certain minimum threshold, of 20 Hz, will thereby be detected.

Transistor 68 operates simply as a switch responsive to transistor 67, and the resulting output signal from inverter 69 is a pulsing signal at the 20 Hz ringing frequency.

Signals outside the narrows 20 Hz pass-band are heavily attenuated and would have to be of greatly increased amplitude to pass through the filter, which is most unlikely. Accordingly the circuit is a reliable ringing voltage detector which is not prone to false operation by common mode signals.

A ring lead ringing voltage detector circuit 70 of similiar construction as that noted above is connected to the ring lead $R_{CO}$, the ground lead GND, and to the voltage supply $V_B$.

A reliable ringing voltage detector circuit 35 suitable for use as described with respect to FIG. 2 is accordingly provided. In the event of either tip or ring lead ringing, the output of inverter 69 provides a 20 Hz square wave pulsing signal for use by ring detector 36.

RINGING DETECTOR

Turning to FIG. 6, a logic diagram of the ringing detector is shown. Assume, for instance, that the subscriber's station set is idle and his line is to be rung on the ring lead to ground from the central office. As described earlier, a 20 Hz ringing signal will appear between ring lead $R_{CO}$ and ground, resulting in a 20 Hz square wave pulse at the output of inverter 69, as described with reference to FIG. 5. The lead designated RRV carries the square wave ringing voltage to a sampling circuit 71. The output of the sampling circuit is connected to positive edge detector 72.

The sampling circuit samples the input 20 Hz square wave waveform during one millisecond intervals and in conjunction with the positive edges detector, passes signals which after passage of their leading edge do not fall during millisecond intervals. Since noise pulses which often are found to amplitude modulate the square wave signal on lead RRV typically have been found to occur at intervals of less than one millisecond, (if they do occur) and since each high amplitude portion of each pulse at the 20 Hz frequency is 23 milliseconds, the above-noted arrangement has the effect of passing only those signals out of the positive edge detector 72 which have a period lasting longer than one millisecond. The effect is to remove the noise of the 20 Hz square wave signal and a clean pulsing signal of good form is produced by the positive edge detector.

It is desired to prohibit sampling of ringing during the period just following the subscriber going off hook but prior to registration thereof by the central office. The low voltage detector 50 is connected to leads $T_{TEL}$ and $R_{TEL}$ and has its output connected to off hook detector 51. The off hook detector detects the low voltage on the leads when the telephone set is off hook as described earlier. As an output the off hook detector has an OFHK lead, which is connected to an inhibit input of the sampling circuit 71. Should the local subscriber remove his handset and thus go off hook just prior to or during ringing, the off hook detector provides a signal on the LOFHK input to the sample circuit 71. The circuit is, as a result, inhibited from sampling the ringing voltage which then might appear, and decoding will not occur.

The output of the positive edge detector is therefore a pulse, which is generated at the beginning of each cycle of ringing voltage.

The ringing pulse output of the positive edge detector 72 is applied to a retriggerable multivibrator 73 which is used as a timer, and which is adapted to recycle every seventy-seven milliseconds. The effect is therefore to reject signals below 15 Hz. This serves to reject rotary dial pulses which might have been detected by the ringing voltage detector erroneously, the frequency of which could be as high as 12 Hz. In addition, ringing voltage frequency could also be out of tolerance and have a frequency as low as 17 Hz. The operation time of the 77 millisecond retriggerable multivibrator is therefore sufficiently long as to be operated by the out of tolerance ringing frequency but sufficiently short to reject out of tolerance dial pulses. Its output is a square wave, having an envelope which is the period length of a complete ring burst.

The aforenoted ring burst envelope outputsignal of the 77 millisecond retriggerable multivibrator 73 is applied to a positive and negative edge detector 74 which provides as an output signal synchronization pulses which coincide with the positive and negative edges of the aforenoted envelopes. The synchronization pulse signal is applied to OR gate 75 which applies as its output signal a reset pulse to a ringing interval timer 76, to synchronize the timer. The intervals of the timer should be less than the expected total errors of the ringing signal timing and the detection error, for example 425 millseconds. The timer can be a counter of well known construction. After being reset and after timing for the aforenoted 425 millisecond period, the timer produces a pulse at its output on lead RCNT. This pulse is also applied back to the OR gate 75, resulting in a self generated reset pulse for the timer. The purpose of the external synchronization is to correct for internal cumulative errors of timing of timer 76.

The output signal of the multivibrator 73, consisting of square waves corrsponding to the envelope of the ringing signal, is also applied to AND gate 77 with the RCNT output signal of timer 76. A series of pulses spaced 425 milliseconds apart, during each ring burst, therefore appears on the output RON lead of AND gate 77, starting 425 millisceonds after the beginning of the first ring burst. Each of the pulses appearing on the RON lead can therefore be counted to indicate the time taken by the envelope of the ring bursts.

The output signal of the multivibrator 73 is also applied to an inverter 78, the output signal of which is applied to AND gate 79. The other input of AND gate 79 is connected to the output of timer 76.

With the inclusion of inverter 78 as shown, output pulses appear on the output ROFF lead of AND gate 79 at the example 425 milliseconds after the end of the last pulse on the RON lead; pulses on the ROFF lead occur at 425 millisecond intervals during the pauses between ring bursts.

In summary, with the reception of bursts of ringing voltage according to a particular subscriber's ringing code, timer 76 provides an output signal on the RCNT lead at approximately half second intervals timed to be synchronized with the leading and trailing edges of the envelope of the ring bursts. In the absence of the syncronization pulses, the timer 76 resets itself, continuously providing output pulses at 425 millisecond (approximately one-half second) intervals. The pulsing output signal on the RON lead, being gated by the presence of actual ringing, provides a count of the time during the ring bursts. The signal on the ROFF lead, being connected to an inverter to which the ring burst envelope signals are applied, consists of pulses during the intervals when the actual ring burst signals are absent. The signals on the RON lead can therefore be used to operate a counter counting sequentially higher and the signal on the ROFF lead can be used to count down in the same counter. In the alternative, and as perferred in this invention, the time of the first ring burst is counted upwardly and the first pulse signal on the ROFF lead is used to toggle the pulse counter to count downwardly (negatively if required) for succeeding ring bursts. A continuous count of pulses at 425 millisecond intervals appears on the RCNT lead, generated by the continuously operating 425 millisecond timer 76, which is set into synchronization with the incoming pulses by the positive and negative edge detector 74. The signal on the RCNT lead is therefore useful as a clock.

A retriggerable multivibrator 80 having first a period of 6.5 seconds is connected to the output of positive edge detector 72. The output signal of the positive edge detector 72 is applied to the input of multivibrator 80, to toggle it and thus generate a signal on the RBSY lead, indicating that ringing is actually occuring. The internal timing of the multivibrator causes it to remain toggled for about 6.5 seconds after the end of each ring burst of normal ringing code, in order to distinguish between the normal interval between ring bursts, and the end of transmission of a complete ringing code. In the case of reception of a long remote disconnect signal, the multivibrator is adapted, by receipt of a signal on the input RCD lead to stay toggled for 26 seconds, thereby providing an output signal on the RBSY lead for that period of time.

The retriggerable multivibrator 80 also applies an output signal on the RBSY lead should a tip ringing signal be received and result in a signal on the TRV lead connected to multivibrator 80 which would occur should another party on the party line be in the state of being rung. The signal on the RBSY lead as a result busies out the local subscriber's RID in order not to allow the local subscriber to go off hook and inadvertently answer the call when the other subscriber is being rung.

Multivibrator 80 is also inhibited by the appearance of a signal on the LOFHK lead which was described earlier, and which lead is connected to an inhibit input (not shown) to multivibrator 80.

We have therefore seen that the output of the ring detector is an RON signal which is comprised of short interval pulses spaced at 425 millisecond intervals during the period of a ring burst, an ROFF signal which is comprised of short interval pulses at 425 millisecond intervals during the periods between ring bursts, an RCNT signal which is comprised of short interval pulses at 425 millisecond intervals for the duration of the entire ringing period and an RBSY signal which is a high level signal during the entire ringing period. Multivibrator 80 keeps RBSY at high level for 6.5 seconds after each ringburst with normal ringing to ensure that no further ringing bursts are to be received, and for 26 seconds after a remote disconnect or reconnect ring burst has been received.

RING DECODER

While normal 20 Hz coded ringing is describer herein, it should be noted that any of a number of systems for selective ringing of a subscriber's station set can be used. Such systems are commonly used with party lines. For instance, a type of system can be used which utilizes different ringing frequencies for different subscribers. Each subscriber's set contains a tuned or frequency selective circuit which is responsive only to the frequency of the ringing signal, thus causing only that subscriber's set to ring. Where that form of system is able to provide a RID SEL high level signal resulting from the sensing of a designated ringing signal, it can be used in the present circuit; the ringing voltage need merely cause a RID Select Register to provide an output pulse at the onset of ringing, upon detection of the proper ringing frequency. A signal to the select register is provided by the ringing voltage detector.

Another type of selective ringing system utilizes the ringing decode scheme described in detail in this specification the ringing signal being generated by the central office, with a particular ringing code designated a particular subscriber's set. Such systems use long and short ring bursts in various sequences with silent intervals between the ring bursts to signify to which subscriber the call is to be directed. The subscriber hearing his own ringing code, answers the telephone. However in the prior art systems there is nothing to stop another subscriber from misinterpreting the ringing code and answering the call, should his ringer be connected in parallel with the called subscriber. In the present invention this is avoided, since a ringing code decoder decodes the ringing code and allows ringing only of the designated subscriber's ringer.

The ringing cycle could be comprised of, for example, one long pulse followed by a pause and three short pulses. The concept utilized in the preferred counting circuit disclosed herein is to count during the timing of both the long and short pulses. A counter is caused to count up during the first ringing burst and down during successive bursts. It has been found that for standard codes the resulting count is unique for each party.

Assuming the first long pulse is one second long, and the three following pulses are each one half second long, a counter is caused to count two units upward for the two one half second portions of the one second pulse, and then count down for the three half second short ring bursts, for a total count of −1. A code selector of well known construction connected to the decoder will cause a high level signal to be applied to a RID SEL lead in the event that the associated subscriber's set is designated by the count of −1. Should it not be so designated, no signal on the RID SEL lead will be generated, and the ringing of the next coded ringing cycle is ignored. The first coded ringing cycle is absorbed by the circuit and is not applied to the ringer of the local subscriber's set in order that decoding might proceed on the entire first coded ringing cycle.

The circuit of FIG. 7 is shown for implementing the above. Ringing code selection switches of known construction are connected to inputs, shown for example as P1, P2, etc. of BCD to decimal converter 85, which switches a ground or if preferred a high level signal to converter 85. These code selection inputs are designative of the particular station set to be rung. A decimal coded output signal is applied as an output to signal path 86, which is connected to the input of exclusive NOR gate 87.

A binary coded decimal up/down counter 88, has an up/down count set input 89, and a clock input 90. The first ROFF ring burst interval signal applied to the up/down input 89 determines whether the counter 88 counts each 425 millisecond spaced pulse up or down during each ring burst. Connected to the clock input 90 of counter 88, is the RON LEAD, on which, as was noted earlier, pulses are applied during the time periods of each ring burst.

As also was noted earlier, the ROFF lead carries pulses during the intervals between ring bursts. This signal is applied to the reset input of a bistable multivibrator 91. With the ring busy lead RBSY at high level during the entire ringing interval and a predetermined time period following and connected to the set input of multivibrator 91, the output of the multivibrator 91 as a result provides a high level output during ring bursts, and low level output during the intervals therebetween to the end of the period timed by retriggerable multivibrator 80. This output is connected to set input 89 of counter 88; the first high level signal causes the up/down counter 88 to count upward with the clock pulses from the RON lead. Once a reset pulse on the ROFF lead has reset multivibrator 91 causing a low level input to counter 88, further clock pulses on the RON lead cause counting down by counter 88.

The output of up/down counter 88 is connected to a binary-coded-decimal to decimal converter 92.

The output 93 of converter 92 has a similar number of leads as the leads at the output of converter 85. The output 93 of converter 92 is connected to exclusive NOR gate 87 where the count of the ringing pulses is compared with the count output of converter 85 as set up by the code established on inputs P1, P2, etc.

The output signal of exclusive NOR gate 87 which appears when matched inputs are present is applied to the input of AND gate 94 which provides an output to RID SELECT register 95. If the first ring burst is longer than 8 half seconds or, more accurately 8, 425 millisecond counts, the BCD up/down counter 88 will count up higher with the disconnect signal than would otherwise be expected with the longest subscriber-identifying coded ringing pulse. An output 99 of BCD to decimal converter 92 provides an output signal with the counting of the long ring burst of greater than 8 counts. This is applied to one of the inputs of AND gate 100. The output lead 99 of the converter 92 is connected to inhibit input 101 of BCD up/down counter 88 to stop the counting of the long disconnect signal pulse (which would be longer than 8 half second counts). Once the pulse is completed, however, the counter 88 is reset in preparation for counting the ringing code periods as will be described later below.

Until this point, the end of cycle counter 96 has counted a count of 8 pulses spaced 425 milliseconds apart, as applied from the RCNT lead connected to the clock input of end of cycle counter 96. The 9th count pulse appears as an output pulse on output lead 102, which is applied to the second input of AND gate 100. With coincidence between signals appearing at output 99 of BCD-to-decimal converter 92 and the signal at output 102 of counter 96, AND gate 100 is enabled and applies a pulse to remote connect-disconnect register 103. The result is an output signal at the RCD lead 106.

With an output signal from the remote connect disconnect register 103 also appearing on lead 105, which lead is connected to an input of OR gate 104, a signal is generated and is applied to reset input RST of counter 88 as well as of counter 96. This causes its count to be reset to 0, in order that future coded ring bursts can be counted.

The RSBY signal which is an inverted signal of that which is carried on the RBSY lead is applied to another input of OR gate 104. Accordingly when a RBSY signal is not present or after reception of a long disconnect signal burst, an output signal from the OR gate 104 is obtained. This output signal is applied to the reset input RST of BCD up/down counter 88 as well as the reset input RST of end-of-cycle counter 96 as noted above. Both counters are therefore set to 0 count prior to the beginning of reception of the station set identification ringing code.

With the application of ringing code to the line for the local subscriber, the ring decoder circuitry operates as described earlier. Should the proper code be received as well as the remote disconnect long ring burst an output will appear both on the RID SEL lead 98 and on the RCD lead 106.

Accordingly, both an enabling and a connect-disconnect signal will have been produced as a result of reception of a long disconnect signal followed within a predetermined period such as 10 seconds by the local subscribers ringing code. The same operation so far described occurs whether the local subscriber's station set is to be disconnected or connected.

RID ENABLE

Turning now to FIG. 8, pulses from the RID SEL and RCD leads are applied as inputs to AND gates 110 and 111; since both pulses are applied as inputs to AND gate 110, an output pulse is generated on the its "output toggle" TOGRE lead. This signal is applied to RID status circuit 112, which is comprised of a bistable multivibrator.

With the generation of pulses on both the RCD and RID SEL leads, resulting in a pulse on the TOGRE lead, output lead RE of the RID status circuit 112 is caused to toggle to high level, and will remain in that state. This condition sets the RID to its active state, allowing connection of the subscribers set to the central office via the tip and ring leads. With generation of a subsequent combination of signals on the RCD and RID SEL leads due to the receipt of another disconnect-reconnect ringing signal followed by the local subscriber's ringing code, another pulse on the TOGRE lead is produced, and the RID status circuit multivibrator changes to its opposite state, causing the RE lead to change to low potential level. The subsriber's set is as a result prohibited from being connected to the central office, and therefore is in its inactive or disconnect state.

SWITCH OPERATING LOGIC

When the RE lead is at high signal potential level, a constant high level signal is applied to the input of an OR gate 113. The output of OR gate 113 is connected to one input of AND gate 111, and as a result when the RID is in its active state an input is constantly presented to AND gate 111. Nothing further will happen unless a pulse on the RID SEL lead is present which is also applied to the other input of AND gate 111.

In operation, when an ordinary incoming call is received, the ringing code is decoded, and an enabling pulse is produced on the RID SEL lead as described herein, but with no signal on the RCD lead. The enabling pulse, in combination with the constant high level RE lead signal applied to AND gate 111, produces a pulse on the SW1 ON lead. This pulse is applied to the switch SW1 drive circuit 43 (FIG. 3) causing the closure of the SW1 switch. Since the SW1 switch is magnetically latched, it remains closed until a pulse from the SW1 drive circuitry causes it to open.

The SW1 switch being closed allows ringing or other signals to pass from the tip and ring leads $T_{CO}$ and $R_{CO}$ connected to the central office through closed switch contacts SW1 to the local subscriber's telephone set. The second sequence of ringing code signal following the first complete transmission of ringing code will thus be transferred directly on the tip and ring leads $T_{TEL}$ AND $R_{TEL}$ to the local subscriber's telephone set ringer. The subscriber then answers his telephone, ringing is stopped by the central office in the normal manner, and a normal call progresses.

In the case of a remote disconnect signal being received however as well as ringing code, a signal appears both on the RCD lead and on the RID SEL lead. An RCD lead input to OR gate 113 causes a pulse to appear on the SW1 ON lead, as noted earlier. This pulse causes the magnetically latched SW1 switches to close and remain closed.

A signal is also produced on the TOGRE lead, which is applied to the multivibrator in the RID status block 112. Accordingly the high level signal on the RE lead is caused to change to low potential level. The enabling action by the high level signal on the RE lead is therefore removed, and the SW1 drive circuit is held enabled as a result of the signal on the RCD lead connected to the input of OR gate 113 as well as the signal on the RID SEL lead connected to AND gate 111. Switches SW1 are therefore held closed for the duration of the 26 second period following receipt of the disconnect (or reconnect) signal established by retriggerable multivibrator 80 (FIG. 6). Following that period the RBSY signal drops to low level having been timed out as does the SEL signal. As a result switch SW1 is switched off, disconnecting the subscriber's set from the leads $T_{CO}$ AND $R_{CO}$ leading to the central office.

It was noted earlier that with receipt of signals on the RID SEL and RCD leads, AND gate 110 was enabled, causing a signal to appear on the TOGRE lead. Once the multivibrator of the RID status block 112 has changed to its opposite state, and the signal on the RE lead dropped to low level as a result, a signal on the RE lead derived from ENABLE circuit 112 is applied with the signal on the TOGRE lead to AND gate 114.

The resulting output signal is applied to the switch SW2 drive circuit 48 (FIG. 3) via the SW2 ON lead. Switch SW2 is therefore operated and held on by its magnetic latch.

Accordingly, during the period of the signal on the RCD lead when received with the signal on the RID SEL lead both switch SW1 and switch SW2 are turned on. As discussed earlier this connects a resistor having an impedance similar to that of the telephone set when off hook across the tip and ring leads $T_{TEL}$ and $R_{TEL}$ on the subscriber's side of the RID circuit, and also connects the tip and ring leads $T_{CO}$ and $R_{CO}$ through to the resistor via switch SW1. Testing of the entire subscriber's line through to the aforenoted resistor can now be done from the central office for the period of the RCD signal.

Also connected to the output of AND gate 110 is a timer 115, which has its output connected to a tone enable circuit 116, for causing an acknowledgement tone to be applied to the line for reception by the central office. It is preferred that the timer 115 should operate for about 1½ second, although other periods can be used. The tone enable circuit 116 is thereby operated for approximately 1½ seconds by timer 115.

The output E1 of the tone enable circuit is connected to an enable input of a tone generator circuit 143 of well known construction, (FIG. 11) and a second output T1 of the tone enable circuit 116 is connected to a tone frequency selection input of the tone generation circuit 143. As the tone generator circuit is of well known construction which is within the skill of a person skilled in the art and its specific circuitry does not form part of this invention, a detailed schematic diagram is not shown.

Accordingly a particular tone is selected and a tone generated for a period of 1½ seconds.

The generated tone is applied to the subscribers line via transformer 15 (FIG. 1), through switch SW2, switches SW1, and to the tip and ring leads $T_{CO}$ and $T_{CO}$ leading to the central office. The central office thereby is given an indication that remote connection or disconnection has occured.

It will be understood that the operation of remote connection and disconnection is identical, except for the difference by which an enable signal on the RE lead of the status circuit 112 is at high potential during the entire period that the RID is active, when the switch SW1 can be operated in a normal manner (i.e. enabled) so as to allow incoming and outgoing calls to the local subscriber to proceed, and by which an enable signal on the RE lead of the status circuit 112 is at low potential during the entire period that the RID is inactive when the switches SW1 are open and cannot be operated in a normal manner, by which the local subscriber is now allowed to make or receive calls.

A further difference between the conditions of RID active or enabled and inactive or disabled is provided for. When in the disabled condition switch SW2 is held closed, by means of its magnetic latching, while switch SW1 is magnetically latched open with removal of the signal on the SW1 ON lead as will be described below. This terminates the subscriber's line adjacent the subscriber's set through the resistor across the tip and ring leads while opening the tip and ring leads $T_{CO}$ and $R_{CO}$ leading to the central office, to bar access by the local subscriber to the central office. The subscriber's earpiece is thus rendered quiet due to the termination.

To provide the further difference noted above, when the RCD signal is generated, it is also applied to a circuit which senses its trailing edge, i.e., to an end of RCD signal detector 117 (See FIG. 8). The output of this circuit is applied to the SW1 drive circuitry to toggle magnetically latched switches SW1 off. Accordingly when the signal on the RCD lead terminates, at the end of the 26 second period, switch SW1 is turned off, leaving switch SW2 on as described more generally above.

When it is desired to allow calls and render the RID active, a signal on the RCD lead is generated in a manner identical to the process described above relating to the disconnection. This timer however, the RID status circuit 112 is caused to make the signal on the RE lead to go to high potential level.

A negative edge detector 119 has one input connected to the output of timer 115, and another input connected to the RE lead. The negative edge connector contains an internal AND gate, which will not allow negative edge detection to occur unless high level signal is present on the RE lead. Once the high level signal on the RE lead is present, signifying the enabling of normal operation of switch SW1, and once the tone caused by tone enable circuit 116 has caused a confirming tone to be returned to the central office as described earlier, the negative edge conclusion of the high level timing signal from timer 115 is detected as a negative edge by negative edge detector 119, and a signal is generated at the output of negative edge detector 119 on the SW2 OFF lead. This signal is applied to the switch SW2 drive circuitry 48 (FIG. 3) causing a pulse to be generated turning switch SW2 off. Switch SW2 is held off by magnetic latching.

As noted earlier, the signal on the RCD lead continues for about 26 seconds, during which time switch SW1 is maintained on in a manner described earlier. With a signal on both the RCD and RID SEL leads, as noted earlier the RID status circuit 112 causes the signal on the RE lead go to high level due to a signal on the TOGRE lead, and switch SW1 is caused to close as a result of the signal on the SW1 ON lead. With the RCD signal being maintained on for about 26 seconds, switch SW1 is kept on for that period of time. However, with timer 115 operating, causing a tone to be generated as described earlier for a period of 1½ seconds, the completion of the timing is detected by negative edge detector 119, with the result that switch SW2 is turned off. The remainder of the period between the termination of the tone and the completion of the 26 second period allows time for the central office to test the entire subscriber's line from the central office through to the telephone set itself. Indeed, once testing has been completed, or as part of the test, the subscriber's station set ringer can be rung, signifying to the subscriber that the line has been reconnected.

The completion or negative edge of the RCD signal is detected by the end of RCD detector 117, causing the switch SW1 drive circuit 43 to apply a pulse to switch SW1, turning switch SW1 off. The entire RID circuit is thereby rendered active, normal and operative, allowing calls to be originated or received by the local subscriber by the previously described circuitry. It should be noted that switch SW1 is closed, as described above, to allow the ringing of the local subscriber's ringer once decoding of the local subscribers ringing code has been completed. Should the subscriber not answer, ringing continues until the calling subscriber hangs up. Once the calling subscriber has hung up, however, after the previously described timing, the signal on the RBSY lead terminates, indicating that ringing has been completed. The trailing edge of the signal on the $\overline{RSBY}$ lead, in dicted as being on the RBSY lead, with an indication that the called subscriber is on hook by a signal on the $\overline{OFHK}$ lead, is applied to the "No Answer" circuit 120. This can be comprised of an AND gate a combination of logic elements or a bistable multivibrator. An output signal of the No Answer circuit 120 is applied to OR gate 118, causing a signal to be applied to the SW1 off lead, which causes switches SW1 to open, disconnecting the subscribers telephone set from the central office. The RID is thus rendered idle.

Also connected to the input of OR gate 118 is on end of incoming call or outgoing call circuit 121. Its input is connected to the $\overline{OFHK}$ lead leading from OFHK detector 51. Upon sensing that the local subscriber has gone on hook after completion of an incoming or outgoing call, the $\overline{OFHK}$ lead is at high level causing circuit 121 to apply a signal to OR gate 118, with the result that the switch SW1 drive circuitry is caused to switch the SWI switches open.

OUTGOING CALL LOGIC

Turning now to FIG. 9, outgoing call register 125 provides output signals on two leads, SW1 ON and ANI. Output pulses are generated on these leads by the register 125 upon the presence of all of three inputs: a RID active signal on the RE lead from the RID status circuit 44, a line available signal on an LA lead from line status circuit 42, and a subscriber off hook signal on the OFHK lead from the off hook detector circuit 51. The signal on the RE lead designates that the RID is in the enable or connect state, allowing a call to be initiated. The signal on the LA lead designates that the status of the line is available for initiation of a call, and that the line and RID is not busy receiving an incoming call. The signal on the OFHK lead designates that the RID has sensed that the subscriber initiating the call has removed his handset and is off hook.

The signal resulting from register 125 on the SW1 ON lead is applied to the SW1 drive circuit 43 as a pulse, which results in switch SW1 closing, connecting the tip and ring leads leading to the central office. Current flows from the central office as a result, causing the central office line relay to operate, to connect an originating register or the like and as a result send dial tone back to the local subscriber. As the central office is connected directly to the local subscriber now he can dial a called subscriber's number using either rotary dial pulses or tones, allowing the central office to operate with the subscriber's set in the normal manner.

It should be noted that all other RID circuits connected to the same party line with their associated subscribers on hook, will have their respective switches SW1 unoperated and therefore open circuited.

When the local subscriber is off hook and the SW1 switches are closed, low rather than high voltage is present at the RID circuit on the subscriber's line leads, leading to the central office as well as to the other RID circuits connected to the same party line. The line voltage detectors LV1 associated with the other RID circuits detect this low voltage, causing the respective line status circuits 42 to indicate that the sub scriber's party line is busy. No signals would therefore be generated on their individual LA (line available) leads, inhibiting the RID circuits from extending call originating service to these associated subscribers.

A high level signal is also generated by the outgoing call register 125 on the ANI lead. This signal is useful should there be a requirement for an automatic number identification circuit to be enabled at the central office. The signal on the ANI lead is used to enable the generation of a tone which is distinctive to, or encoded to identify the individual local subscriber originating the call. Previous to this invention the central office could not identify individual subscribers originating a call connected to a party line.

After the digits have been dialled by the local subscriber, there will be ringback tone returned by the central office to the calling subscriber after which the called subscriber may answer, or if the called subscriber's set is busy there will be busy tone returned to the calling subscriber by the central office. Following the call, or in case of busy tone, the calling subscriber will hang up. Switch SW1 will be opened, opening the tip and ring leads between the calling subscriber andthe switching office as described with reference to FIG. 8 relating to the end of an incoming or outgoing call, or no answer. The RID is thus returned to its idle status.

SWITCH AND TONE DRIVE

For the case of privacy interrupt described earlier, i.e. the local subscriber wishing to access the line while a call on the party line is in progress the following apparatus and sequence of events is operative. A busy tone register 126 causes an output signal to be generated when all of three inputs are present. The first input is a signal on the LA lead (which is derived from the LA lead in the line status circuit 42 FIG. 2) that the party line is not available. The second input is on the OFHK lead from the off hook detector 51, signifying that the local subscriber has gone off hook. The third input is on the RE lead from the RID status circuit 44, signifying that the RID is is an enabled condition, and that service is extended to the calling subscriber.

It should be noted that switches SW1 contacts which connect the tip and ring leads $T_{TEL}$ and $R_{TEL}$ leading to the local subscriber to the tip and ring leads $T_{CO}$ and $R_{CO}$ leading to the party line and to the central office are open, and there can at this stage be no communication therebetween.

The output signal of the busy tone register 126 signifies that a local call is requested but that the party line is in use. This output signal is then applied to both the busy tone encoder 127, which provides an output signal on its BT lead, and to the ringing tone encoder 128.

It should be noted that the same sequence occurs should the local subscriber be calling while ringing occurs on the line. The line status will indicate that the line is not available due to the ringing voltage detector detecting the beginning of a ring burst, and as a result of a ring busy signal being applied to the line status circuit 42.

The ringing tone encoder 128 also has a pair of input leads TRV and RRV, which are connected to the output of the ringing voltage detector described with reference to FIG. 5. Should either of the three inputs, from the busy tone register 126, the tip ringing voltage or ring ringing voltage detector provide an input signal to ringing tone encoder 128, an output signal will appear on its RT lead. Should there be an output signal from busy tone register 126, ringing tone and/or busy tone will be generated as a result of the output signals on leads BT and RT.

To reiterate, a busy tone pulse signal (which causes busy tone to be returned to the local subscriber) appears on lead BT when the local subscriber goes off hook at the same time that the party line is in use. This busy tone is returned only to the local subscriber, as will be described further later, due to switches SW1 remaining open. Should ringing occur on the line at the same time that the calling subscriber lifts his handset (which ringing will not be heard by the local subscriber during the tone decoding period, or even after the tone decoding, should the ringing code be designating another subscriber), both busy tone and ringing tone will only be returned to the local subscriber. In the event that the local subscriber has initiated a revertive type of call only the ringing tone will be generated and returned to the calling subscriber. In this case the ringing tone serves as a normal ringback tone.

Since a major feature of this invention is the privacy given to the party line subscriber having a call already in progress, switches SW1 have not been closed. The busy and/or ringing tones are retured only to the interrupting local subscriber, and not to the parties to the call in progress. Since switches SW1 are open, privacy is maintained and the interrupting party can neither hear no speak on the tip and ring leads leading to the central office.

As was described earlier, however, the local subscriber can interrupt the call in progress, while giving warning to the parties who are using the line. To initiate this function the interrupting party flashes his hookswitch.

The hookswitch flash is timed and a high level output is generated on the FH lead of the offhook detector 51 (FIG. 3) and after the flash is over, on lead OFHK. The FH lead is also connected to an inhibit input of a first busy tone register 126. Another inhibit input into the busy tone register 126 is from lead LV2, indicating that the interrupting party has gone on hook. Since the signal on the OFHK lead from off hook detector 51 is delayed by at least 2 seconds due its internal requirement to distinguish a true off hook condition from a hookswitch flash, the LV2 indication is a much faster indicator to the busy tone register 126 that the busy tone must be terminated, immediately after the interrupting subscriber has gone on hook, and not after the aforenoted delay.

The output of the busy tone register 126 is applied to a barge in tone (Bit 1) register 129. That signal plus an input signal on the LOFHK lead causes the barge in tone register 1 to generate a signal on an SW1 ON lead and an SW2 ON lead which are respectively connected to the switch SW1 and switch SW2 operation circuits. Pulse signals as a result appearing on the latter leads therefore cause both switches SW1 and switch SW2 to turn on, closing the tip and ring leads from the local subscriber's station set to the tip and ring leads leading to the party line which is currently in use.

The barge in tone 1 register 129 output also is connected to a 1.5 second timer 130. The timer is connected to a tone encoder 131 which has its output connected to the barge in tone lead BIT 1, for enabling the initiation of a barge-in tone on the subscribers line. Tone encoder 131 is operated for the 1.5 second period timed by timer 130.

Another output of the 1.5 second timer 130 is connected to the switch SW2 off driver via lead SW2 OFF.

It will be noted that with the initiation of a hookswitch flash resulting in an input to the barge in tone 1 register 129, switch SW2 has been turned on as well as switches SW1. With switch SW2 on, tone can be applied to the subscriber's line as was described earlier. At the same time, a 1.5 second timer causes tone encoder 131 to initiate the barge in tone, which, through switches SW1 and switch SW2 is applied to the subscriber's line both to the parties of the call in progress and to the local subscriber (the latter somewhat attenuated). After 1.5 seconds, switch SW2 is caused to open, opening the contacts by which the tone generation circuit finds a complete circuit to the tip and ring leads. At the same time the tone encoder 131, having been timed out, terminates the barge in tone enabling on the BIT 1 lead.

The 1.5 second timer output is also connected to a 10 second timer 132. The purpose of timer 132 is to establish the period during which the interrupting subscriber is able to communicate with the parties of the call in progress.

The output of the 10 second timer 132 is applied to a second barge-in-tone register 133. The output of the second barge in tone register is connected to the switch SW2 drive circuitry via a SW2 ON lead. Once the 10 second timer has timed out, the second barge in register 133 causes operation of switch SW2 via the SW2 ON lead. This allows a "termination of interruption" tone to be applied to the tip and ring leads.

The output of the register 133 is also connected to 1.5 second timer 134, which has its output connected to tone encoder 135. Tone encoder 135 has its output connected to tone drive circuitry via the BIT 2 lead. Tone encoder 135 is actuated by the timer 134 for the timed period of 1.5 seconds.

Another input of timer 134 is connected to both the switches SW1 and switch SW2 off circuitry via the SW1 OFF and SW2 OFF leads.

Accordingly, once the 1.5 second timer 130 has completed its timeout as described earlier, switch SW2 is shut off as well as the barge in tone initiated as lead BIT 2.

Since the 1.5 second timer 134 has been enabled from the output of register 133, which has caused the operation of tone encoder 135, a second barge in tone (preferably of a different frequency than the first barge in tone), via the BIT 2 lead, is applied to the tip and ring leads. This tone signifies to all parties that the interruption period, that is the time of non-privacy, has been completed and that privacy will now be re-established.

As was noted earlier, during the interruption 10 second period the interrupting subscriber can give details of any emergency situation which might exist, and verbally request the parties of the call in progress to terminate their call.

At the end of the second 1.5 second period, a second output of timer 134 applies a signal to the switches SW1 and switch SW2 drive circuitry via the SW1 OFF and SW2 OFF leads, causing opening of the circuit by which the second barge in tone is applied to the tip and ring leads, and also opening the direct connection between the tip and ring leads $T_{TEL}$ and $R_{TEL}$ connected to the telephone set and the tip and ring leads $T_{CO}$ and $R_{CO}$ connected to the central office, and also to the parties of the call in progress.

It is possible that the parties of the call in progress terminate the call during the 10 second interruption period timed by timer 132. Inputs on the $\overline{LOFHK}$ lead to the barge-in register 133 inhibits operation of that register, thus eliminating the generation of the second barge in tone and the accompaning operation of switch SW2. Switch SW1, however, is left closed, allowing the interrupting party immediate access to the line during the remainder of the 10 second period.

Should the interrupting party have remained off hook switch SW1 however will retain the connection between the calling subscriber and the central office. To obtain dial tone, the calling subscriber must go temporarily on hook, and then can dial the digits of the number to be called as a normal outgoing call.

There are further safeguards against erroneous operation. Busy tone register 129 has an input connected to the LOFHK lead which signifies that a call is in fact in progress, when it receives an indication that there has been a hookswitch flash, from the busy tone register. There therefore is a signal both on the LOFHK and FH leads causing operation of the busy tone register 129 for an output signal of busy tone register 129 to be produced.

If the local subscriber wishes to have access to the line at the same time that ringing is occuring on the line (although not heard at the local subscriber's ringer), there will already be ringing busy indication on the RBSY lead (See FIG. 6). The RBSY lead is connected to inhibit inputs of both the first and second barge-in-tone registers 129 and 133. The local subscriber in lifting up his handset at the time that the line is ringing, accidently terminates the call as if it were the proper called party. This stops the ringing from the central office in the normal manner. The local subscriber is then connected to the calling party. Recognizing that it is the incorrect parties to which they are speaking, both the local and incoming call subscribers terminate the call. The local subscriber goes on hook, which sets the RID to the normal idle condition, and then goes off hook again in order to make his outgoing call.

The aforenoted sequence, even though apparently making a wrong connection of subscribers, is preferred since the outgoing call may be one of urgency, and to allow the proper call to be completed by barring access to the line by the local subscriber during the ringing period, then allowing barge in, notification of an emergency, etc, would take an untowardly long period of time.

AUTOMATIC RINGBACK AND ANI

The present invention also provides the facility for ringing the local subscriber to notify him of the availability of an idle line after the termination of use of the line, in the event the local subscriber had gone off-hook in a desire to make a call and thus to have received locally generated busy tone indicating that the party line was in use.

In addition, for the first time, the present invention provides means for allowing the central office to identify which local subscriber is initiating an outgoing call. To facilitate this service, the RID circuit associated with the local subscriber generates a tone which is unique to that subscriber with respect to the remaining subscribers on the party line, which is returned to the central office as will be described below.

As was described earlier, once the local subscriber had lifted his handset when a call is in progress, a busy tone enabling signal is generated on the BT output lead of busy tone encoder 127. Turning to FIG. 10, this lead is connected to the input of RBT (ring back tone) register 235, and sets the register. An RBT lead, to be described later below, is connected to the reset input of the RBT register 235.

the first and second terminal means in the event the status of the multi-party line is busy, (d) means connected to the second terminal means for applying a busy signal to the second terminal means for transmission to the subscriber's set upon the subscriber's set going off hook when the detecting means detects said busy status of the telephone line, and (e) means for detecting ringing signals at the first terminal means and for determining if the ringing is designative of said subscriber's set, and for automatically connecting said talking path in the event said ringing signals have been determined as being designative of said subscriber's set to allow further ringing signals to be applied to said subscriber's set.

2. A station set interface circuit as defined in claim 1, in which the means for detecting the idle or busy status is comprised of a line voltage detector connected between the first pair of terminal means having voltage threshold means for indicating the line is idle when the detected voltage is above a predetermined threshold and busy when the detected voltage is below said threshold.

3. A station set interface circuit as defined in claim 2 in which the busy signal is a busy tone, and further including interrupt means for terminating the busy tone and for automatically providing said talking path between the first and second terminal means upon reception of a predetermined signal at the second terminal means from the station set.

4. A station set interface circuit as defined in claim 3 in which the interrupt means comprises means for providing said talking path only for a predetermined period of time, and further comprising means for applying a short period tone to the first terminal means at the beginning and at the end of the period of time.

5. A station set interface circuit as defined in claim 1, 2 or 4 further including a ringing voltage detector connected to said first terminal means for detecting said ringing signals, and means connected to the ringing voltage detector for decoding bursts of the ringing signals, for matching the decoded bursts with a predetermined code, and for enabling connection of the talking path in the event the decoded bursts match the predetermined code.

6. A station set interface circuit as defined in claim 4 in which the interrupt means is comprised of means for recognising a hookswitch flash from the subscriber's set as said predetermined signal.

7. A station set interface circuit as defined in claim 2, 3 or 6, further including a ringing voltage detector connected to said first terminal means for detecting said ringing signal, means connected to the ringing voltage detector for decoding bursts of the ringing signals, for matching the decoded bursts with a predetermined code, and for enabling connection of the talking path in the event the decoded bursts match the predetermined code; a status circuit having an active and an inactive state, and means for connection of said talking path only in the event the status circuit is in its active state and upon enabling by the decoding means.

8. A station set interface circuit comprising:
(a) a first pair of terminal means for connection to a multi-party telephone line,
(b) a second pair of terminal means for connection to a subscriber's set,
(c) means for detecting ringing signals at the first terminal means and for determining if the ringing is designative of said subscriber's set, and for automatically connecting a talking path in the event said ringing signals have been determined as being designative of said subscriber's set to allow further ringing signals to be applied to said subscriber's set,
(d) means connected to the first and second terminal means for detecting the idle or busy status of the multi-party line and in response to a request for service from the subscriber's set for automatically connecting said talking path between the first and second terminal means in the event the status of said line is idle and for causing an open circuit between the first and second terminal means in the event the status of the multi-party line is busy, and
(e) interrupt means for automatically providing said talking path between the first and second terminal means upon reception of a predetermined signal at the second terminal means from the station set.

9. A station set interface circuit as defined in claim 8, in which the interrupt means comprises means for providing said talking path only for a predetermined period of time, and means for recognising a hookswitch flash from the subscriber's set as said predetermined signal, and further comprising means for applying a short period tone to the first terminal means at the beginning and at the end of the period of time.

10. A station set interface circuit comprising:
(a) a first pair of terminal means for connection to a multi-party telephone line,
(b) a second pair of terminal means for connection to a subscriber's set,
(c) means connected to the first and second terminal means for detecting the idle or busy status of the multi-party line and in response to a request for service from the subscriber's set for automatically connecting a talking path between the first and second terminal means in the event the status of said line is idle and for causing an open circuit between the first and second terminal means in the event the status of the multi-party line is busy,
(d) means connected to the second terminal means for applying a busy signal to the second terminal means for transmission to the subscriber's set upon the subscriber's set going off hook when the detecting means detects said busy status of the telephone line, and
(e) a status circuit having active or inactive states, means for receiving a status designation signal from a central office adapted to set the status circuit to its active or inactive state, means for sensing a request for service at the second pair of terminal means, and means for automatically connecting a talking path between the first and second pair of terminal means upon reception of the request for service only in the event the status circuit is in its active state and the telephone line is idle.

11. A station set interface circuit as defined in claim 10, in which the means for sensing a request for service is comprised of means for detecting an off-hook condition from the subscriber's set at the second pair of terminal means.

12. A station set interface circuit as defined in claim 11 in which the means for detecting the off-hook condition is comprised of a low voltage detector having means for providing an output signal in the event the voltage across the second pair of terminals is below a predetermined level.

13. A station set interface circuit as defined in claim 11 or 12, further including means for applying a tone of predetermined frequency to the first terminal means for a short period after the talking path has been automatically connected.

14. A station set interface circuit as defined in claim 11 or 12, further including means for applying a signal for a short period to the first terminal means which is unique to said interface circuit with respect to others which may be connected to the multi-party telephone line, and for the same short period applying a short circuit between the second pair of terminal means.

15. A station set interface circuit as defined in claim 11 further including means connected to the second terminal means for applying a busy tone to the second terminal means for transmission to the subscriber's set upon the subscriber's set going off-hook while the detecting means detects a busy status of the telephone line.

16. A station set interface circuit as defined in claim 15 further including status memory means, means for sensing a disconnect signal from a central office at the first terminal means, means for determining the address of the disconnect signal and for enabling the status memory means to change the active or inactive state of the interface circuit in response to the sensing of both the disconnect signal and said address, the latter designative of said interface circuit, and means for prohibiting the connection of a talking path between the first and second terminal means in the event the status of the interface circuit is inactive.

17. A station set interface circuit as defined in claim 16, further including means for connecting a talking path between the first and second terminal means and for simultaneously connecting an impedance between the pair of second terminal means similar to the impedance of said subscriber's set for a predetermined period of time after sensing of the disconnect signal and determination of said designative address, and prior to said prohibiting the connection of the talking path, and for retaining said impedance connected between the pair of second terminal means following said period time, and for removing said impedance upon the sensing of a reconnect signal and determination of said designative address.

18. A station set interface circuit as defined in claim 16, in which the means for determining the address of the disconnect signal is comprised of means for counting burst periods and burst interval periods of the ringing signal and matching a number counted with a predetermined number which is unique to said interface circuit relative to others which may be connected to said multi-party line, and in which the means for sensing the disconnect signal is comprised of means for determining the count of a ringing signal burst exceeding a predetermined period.

19. A station set interface circuit as defined in claim 18, further including means, after establishment of the talking path between the first and second terminal means and dialing from said subscriber's set of the digits of another subscriber's set connected to said multi-party telephone line, for sensing a hookswitch flash at said first terminal means and in response for applying ringing tone to said first terminal means, whereupon the first subscriber is enabled to hear simulated ringing of the other subscriber, and for cutting off the ringing tone upon said another subscriber going off-hook.

20. A station set interface circuit as defined in claim 11, further including a ringing voltage detector connected to said first terminal means for detecting ringing signals, means connected to the ringing voltage detector for decoding bursts of the ringing signals, for matching the decoded bursts with a predetermined code, and for enabling connection of the talking path in the event the decoded bursts match the predetermined code, a status circuit having an active or an inactive state, and means for connection of said talking path only in the event the status circuit is in its active state and upon enabling by the decoding means.

21. A station set interface circuit as defined in claim 20, in which the means for sensing a request for service is comprised of means for detecting an off-hook condition from the subscriber's set at the pair of second terminal means.

22. A station set interface circuit as defined in claim 21, further including means for registering a temporary off-hook condition signifying a request for service from the subscriber's set at the second terminal means and the subsequent maintenance of an open circuit between the first and second terminal means due to the busy status of the telephone line signifying an unfulfilled request for service, and in response to said registration, for signalling the switching office upon the telephone line becoming idle by applying predetemined tone to the first terminal means, whereby the central switching office can be enabled to apply the ringing code of said subscriber's set to the telephone line followed by a short ring burst for signalling the subscriber's set that the line has become idle.

23. A station set interface circuit as defined in claim 20, 21 or 22, in which the means for determining the address of the disconnect signal is comprised of means for counting burst periods of the ringing signal and matching the count with a predetermined count which is unique to said interface circuit relative to others which may be connected to said multi-party line, and in which the means for sensing the disconnect signal is comprised of means for determining the count of a ringing signal burst exceeding a predetermined period.

24. A station set interface circuit as defined in claim 20, 21 or 22 further including means for sensing a hookswitch flash at said second terminal means, after the connection of the talking path between the first and second terminal means and dialing from said subscriber's set of the digits of another subscriber's set connected to said multi-party telephone line, and in response to said flash, for temporarily open circuiting said talking path and applying ringing tone to said first terminal means, and for reclosing said talking path upon said another subscriber going off-hook.

25. A station set interface circuit as defined in claim 10 in which the means for sensing a request for service is comprised of means for detecting ringing signals at the first terminal means, for determining if the ringing is designative of said subscriber's set, and for automatically connecting said talking path only in the event said ringing signals have been determined as being designative of said subscriber's set.

26. A station set interface circuit as defined in claim 10 in which the means for sensing a request for service is comprised of a ringing voltage detector connected to said first terminal means for detecting ringing signals; decoding means connected to the ringing voltage detector for decoding bursts of the ringing signals and for matching the decoded bursts with a predetermined code; and further means for enabling connection of the conductive path only in the event the decoded bursts the first and second terminal means in the event the status of the multi-party line is busy, (d) means connected to the second terminal means for applying a busy signal to the second terminal means for transmission to the subscriber's set upon the subscriber's set going off hook when the detecting means detects said busy status of the telephone line, and (e) means for detecting ringing signals at the first terminal means and for determining if the ringing is designative of said subscriber's set, and for automatically connecting said talking path in the event said ringing signals have been determined as being designative of said subscriber's set to allow further ringing signals to be applied to said subscriber's set.

2. A station set interface circuit as defined in claim 1, in which the means for detecting the idle or busy status is comprised of a line voltage detector connected between the first pair of terminal means having voltage threshold means for indicating the line is idle when the detected voltage is above a predetermined threshold and busy when the detected voltage is below said threshold.

3. A station set interface circuit as defined in claim 2 in which the busy signal is a busy tone, and further including interrupt means for terminating the busy tone and for automatically providing said talking path between the first and second terminal means upon reception of a predetermined signal at the second terminal means from the station set.

4. A station set interface circuit as defined in claim 3 in which the interrupt means comprises means for providing said talking path only for a predetermined period of time, and further comprising means for applying a short period tone to the first terminal means at the beginning and at the end of the period of time.

5. A station set interface circuit as defined in claim 1, 2 or 4 further including a ringing voltage detector connected to said first terminal means for detecting said ringing signals, and means connected to the ringing voltage detector for decoding bursts of the ringing signals, for matching the decoded bursts with a predetermined code, and for enabling connection of the talking path in the event the decoded bursts match the predetermined code.

6. A station set interface circuit as defined in claim 4 in which the interrupt means is comprised of means for recognising a hookswitch flash from the subscriber's set as said predetermined signal.

7. A station set interface circuit as defined in claim 2, 3 or 6, further including a ringing voltage detector connected to said first terminal means for detecting said ringing signal, means connected to the ringing voltage detector for decoding bursts of the ringing signals, for matching the decoded bursts with a predetermined code, and for enabling connection of the talking path in the event the decoded bursts match the predetermined code; a status circuit having an active and an inactive state, and means for connection of said talking path only in the event the status circuit is in its active state and upon enabling by the decoding means.

8. A station set interface circuit comprising:
(a) a first pair of terminal means for connection to a multi-party telephone line,
(b) a second pair of terminal means for connection to a subscriber's set,
(c) means for detecting ringing signals at the first terminal means and for determining if the ringing is designative of said subscriber's set, and for automatically connecting a talking path in the event said ringing signals have been determined as being designative of said subscriber's set to allow further ringing signals to be applied to said subscriber's set, (d) means connected to the first and second terminal means for detecting the idle or busy status of the multi-party line and in response to a request for service from the subscriber's set for automatically connecting said talking path between the first and second terminal means in the event the status of said line is idle and for causing an open circuit between the first and second terminal means in the event the status of the multi-party line is busy, and (e) interrupt means for automatically providing said talking path between the first and second terminal means upon reception of a predetermined signal at the second terminal means from the station set.

9. A station set interface circuit as defined in claim 8, in which the interrupt means comprises means for providing said talking path only for a predetermined period of time, and means for recognising a hookswitch flash from the subscriber's set as said predetermined signal, and further comprising means for applying a short period tone to the first terminal means at the beginning and at the end of the period of time.

10. A station set interface circuit comprising:
(a) a first pair of terminal means for connection to a multi-party telephone line,
(b) a second pair of terminal means for connection to a subscriber's set,
(c) means connected to the first and second terminal means for detecting the idle or busy status of the multi-party line and in response to a request for service from the subscriber's set for automatically connecting a talking path between the first and second terminal means in the event the status of said line is idle and for causing an open circuit between the first and second terminal means in the event the status of the multi-party line is busy,
(d) means connected to the second terminal means for applying a busy signal to the second terminal means for transmission to the subscriber's set upon the subscriber's set going off hook when the detecting means detects said busy status of the telephone line, and
(e) a status circuit having active or inactive states, means for receiving a status designation signal from a central office adapted to set the status circuit to its active or inactive state, means for sensing a request for service at the second pair of terminal means, and means for automatically connecting a talking path between the first and second pair of terminal means upon reception of the request for service only in the event the status circuit is in its active state and the telephone line is idle.

11. A station set interface circuit as defined in claim 10, in which the means for sensing a request for service is comprised of means for detecting an off-hook condition from the subscriber's set at the second pair of terminal means.

12. A station set interface circuit as defined in claim 11 in which the means for detecting the off-hook condition is comprised of a low voltage detector having means for providing an output signal in the event the voltage across the second pair of terminals is below a predetermined level.

13. A station set interface circuit as defined in claim 11 or 12, further including means for applying a tone of predetermined frequency to the first terminal means for a short period after the talking path has been automatically connected.

14. A station set interface circuit as defined in claim 11 or 12, further including means for applying a signal for a short period to the first terminal means which is unique to said interface circuit with respect to others which may be connected to the multi-party telephone line, and for the same short period applying a short circuit between the second pair of terminal means.

15. A station set interface circuit as defined in claim 11 further including means connected to the second terminal means for applying a busy tone to the second terminal means for transmission to the subscriber's set upon the subscriber's set going off-hook while the detecting means detects a busy status of the telephone line.

16. A station set interface circuit as defined in claim 15 further including status memory means, means for sensing a disconnect signal from a central office at the first terminal means, means for determining the address of the disconnect signal and for enabling the status memory means to change the active or inactive state of the interface circuit in response to the sensing of both the disconnect signal and said address, the latter designative of said interface circuit, and means for prohibiting the connection of a talking path between the first and second terminal means in the event the status of the interface circuit is inactive.

17. A station set interface circuit as defined in claim 16, further including means for connecting a talking path between the first and second terminal means and for simultaneously connecting an impedance between the pair of second terminal means similar to the impedance of said subscriber's set for a predetermined period of time after sensing of the disconnect signal and determination of said designative address, and prior to said prohibiting the connection of the talking path, and for retaining said impedance connected between the pair of second terminal means following said period time, and for removing said impedance upon the sensing of a reconnect signal and determination of said designative address.

18. A station set interface circuit as defined in claim 16, in which the means for determining the address of the disconnect signal is comprised of means for counting burst periods and burst interval periods of the ringing signal and matching a number counted with a predetermined number which is unique to said interface circuit relative to others which may be connected to said multi-party line, and in which the means for sensing the disconnect signal is comprised of means for determining the count of a ringing signal burst exceeding a predetermined period.

19. A station set interface circuit as defined in claim 18, further including means, after establishment of the talking path between the first and second terminal means and dialing from said subscriber's set of the digits of another subscriber's set connected to said multi-party telephone line, for sensing a hookswitch flash at said first terminal means and in response for applying ringing tone to said first terminal means, whereupon the first subscriber is enabled to hear simulated ringing of the other subscriber, and for cutting off the ringing tone upon said another subscriber going off-hook.

20. A station set interface circuit as defined in claim 11, further including a ringing voltage detector connected to said first terminal means for detecting ringing signals, means connected to the ringing voltage detector for decoding bursts of the ringing signals, for matching the decoded bursts with a predetermined code, and for enabling connection of the talking path in the event the decoded bursts match the predetermined code, a status circuit having an active or an inactive state, and means for connection of said talking path only in the event the status circuit is in its active state and upon enabling by the decoding means.

21. A station set interface circuit as defined in claim 20, in which the means for sensing a request for service is comprised of means for detecting an off-hook condition from the subscriber's set at the pair of second terminal means.

22. A station set interface circuit as defined in claim 21, further including means for registering a temporary off-hook condition signifying a request for service from the subscriber's set at the second terminal means and the subsequent maintenance of an open circuit between the first and second terminal means due to the busy status of the telephone line signifying an unfulfilled request for service, and in response to said registration, for signalling the switching office upon the telephone line becoming idle by applying predetemined tone to the first terminal means, whereby the central switching office can be enabled to apply the ringing code of said subscriber's set to the telephone line followed by a short ring burst for signalling the subscriber's set that the line has become idle.

23. A station set interface circuit as defined in claim 20, 21 or 22, in which the means for determining the address of the disconnect signal is comprised of means for counting burst periods of the ringing signal and matching the count with a predetermined count which is unique to said interface circuit relative to others which may be connected to said multi-party line, and in which the means for sensing the disconnect signal is comprised of means for determining the count of a ringing signal burst exceeding a predetermined period.

24. A station set interface circuit as defined in claim 20, 21 or 22 further including means for sensing a hookswitch flash at said second terminal means, after the connection of the talking path between the first and second terminal means and dialing from said subscriber's set of the digits of another subscriber's set connected to said multi-party telephone line, and in response to said flash, for temporarily open circuiting said talking path and applying ringing tone to said first terminal means, and for reclosing said talking path upon said another subscriber going off-hook.

25. A station set interface circuit as defined in claim 10 in which the means for sensing a request for service is comprised of means for detecting ringing signals at the first terminal means, for determining if the ringing is designative of said subscriber's set, and for automatically connecting said talking path only in the event said ringing signals have been determined as being designative of said subscriber's set.

26. A station set interface circuit as defined in claim 10 in which the means for sensing a request for service is comprised of a ringing voltage detector connected to said first terminal means for detecting ringing signals; decoding means connected to the ringing voltage detector for decoding bursts of the ringing signals and for matching the decoded bursts with a predetermined code; and further means for enabling connection of the conductive path only in the event the decoded bursts match the predetermined code, in response to the output of the decoding means.

27. A station set interface circuit as defined in claim 10, 12 or 26 further including means for receiving a disconnect or reconnect signal accompanying ringing signals from a central office at the first terminal and for providing a status change signal to the status circuit whereby the status circuit is placed into its inactive state upon receipt of the disconnect signal with the ringing signal designative of said subscriber's set, and into its active state upon receipt of the reconnect signal with the ringing signal designative of said subscriber's set.

28. A station set interface circuit comprising:
(a) a first pair of terminal means for connection to a multi-party telephone line,
(b) a second pair of terminal means for connection to a subscriber's set,
(c) means connected to the first and second terminal means for detecting the idle or busy status of the multi-party line and in response to a request for service from the suscriber's set for automatically connecting a talking path between the first and second terminal means in the event the status of said line is idle and for causing an open circuit between the first and second terminal means in the event the status of the multi-party line is busy,
(d) means connected to the second terminal means for applying a busy signal to the second terminal means for transmission to the subscriber's set upon the subscriber's set going off hook when the detecting means detects said busy status of the telephone line, and
(e) status memory means, means for sensing a disconnect signal from a central office at the first terminal means, means for determining the address of the disconnect signal and for enabling the status memory means to change the active or inactive state of the interface circuit in response to the sensing of both the disconnect signal and determination of said address, the latter being designative of said interface circuit, and means for prohibiting the connection of a talking path between the first and second terminal means in the event the status of the interface surface is inactive.

29. A station set interface circuit as defined in claim 28, further including means for connecting a talking path between the first and second terminal means and for simultaneously connecting an impedance between the pair of second terminal means similar to the impedance of said subscriber's set for a predetermined period of time after sensing of the disconnect signal and determination of said designative address, and prior to said prohibiting the connection of the talking path.

30. A station set interface cricuit as defined in claim 29 further including means for retaining said impedance connected between the pair of second terminal means following said period of time, and for disconnecting said impedance upon the sensing of a reconnect signal and determination of said designative address.

31. A station set interface circuit as defined in claim 28, 29 or 30 in which the means for determining the address of the disconnect signal is comprised of means for counting burst periods of the ringing signal and matching the count with a predetermined count which is unique to said interface circuit relative to others which may be connected to said multi-party line, and in which the means for sensing the disconnect signal is comprised of means for determining that the length of a ringing signal burst exceeds a predetermined period.

32. A station set interface circuit as defined in claim 1, 10 or 28 further including means for sensing a hookswitch flash at said second terminal means after the connection of the talking path between the first and second terminal means and dialing of the digits from said subscriber's set designative of another subscriber's set connected to said multi-party telephone line, and in response to said flash for temporarily open-circuiting said talking path and applying ringing tone to said first terminal means, and for reclosing said talking path upon said another subscriber going off-hook.

33. A station set interface circuit comprising:
(a) a first pair of terminal means for connection to a multi-party telephone line associated with a central switching office,
(b) a second pair of terminal means for connection to a subscriber's set,
(c) means connected to the first and second terminal means for detecting the idle or busy status of the multi-party line and in response to a request for service from the subscriber's set for automatically connecting a talking path between the first and second terminal means in the event the status of said line is idle and for causing an open circuit between the first and second terminal means in the event the status of the multi-party line is busy,
(d) means connected to the second terminal means for applying a busy signal to the second terminal means for transmission to the subscriber's set upon the subscriber's set going off-hook when the detecting means detects said busy status of the telephone line, and
(e) means for registering a temporary off-hook condition signifying a request for service from the subscriber's set at the second terminal means and subsequently maintaining an open circuit between the first and second terminal means due to the busy status of the telephone line signifying an unfulfilled requested for service, and in response to the registration of said off-hook condition, for signalling the switching office upon the telephone line becoming idle by applying a predetermined tone to the first terminal means, whereby the central switching office can be enabled to apply a short ring burst for signalling a local subscriber that the line has become idle.

34. A station set interface circuit as defined in claim 33, in which the means for detecting is comprised of a line voltage detector connected between the first pair of terminal means having voltage threshold means for indicating that the line is idle when the detected voltage is above a predetermined threshold and busy when the detected voltage is below said threshold.

35. A station set interface circuit as defined in claim 34 in which the busy signal is a busy tone, and further including interrupt means for terminating the busy tone and for automatically providing said talking path between the first and second terminal means upon reception of a predetermined signal at the second terminal means from the station set, and in which the interrupt means comprises means for providing said talking path only for a predetermined period of time, and further comprising means for applying a short period tone to the first terminal means at the beginning and at the end of the period of time.

36. A circuit for disconnecting of a station set which is connected to a subscriber's line from a remote location, comprising means for receiving a disconnect signal of a predetermined nature from the subscriber's line, means for translating the disconnect signal into a status set signal, means for receiving a second signal designative of the particular station set from the subscriber's line, and for translating the second signal into an enabling signal, and means for causing disconnection of the station set from the subscriber's line upon reception thereby of both the enabling signal and the status set signal.

37. A circuit for disconnection of a station set connected to a subscriber's line from a remote location as defined in claim 36 in which the means for translating the second signal is comprised of means for translating a ringing signal applied to the subscriber's line for ringing the station set.

38. A circuit for disconnection of a station set connected to a subscriber's line from a remote location as defined in claim 36 or 37 in which the means for translating the disconnect signal is comprised of means for translating a ring burst of a predetermined minimum length of time.

39. A circuit for disconnection of a station set connected to a subscriber's line from a remote location as defined in claim 36 or 37 in which the means for translating the disconnect signal is comprised of means for translating a tone signal received immediately preceeding the second signal.

40. A circuit for disconnection of a station set connected to a subscriber's line from a remote location as defined in claim 36 in which the means for translating the disconnect signal is comprised of means for translating a ring burst of a predetermined length of time, and the means for translating the second signal is comprised of means for decoding a ringing signal designative of the station set to which the ringing signal is directed and in response to the decoding, for generating an enabling signal.

41. A circuit for disconnection of a station set connected to a subscriber's line from a remote location as defined in claim 40 in which said means for causing said disconnection further includes means for reconnection of the station set to the subscriber's line upon later reception of said disconnect signal followed immediately by said ringing signal designative of said station set.

42. A circuit for disconnecting or reconnecting a station set connected to a subscriber's line from a remote location comprising:
  (a) input tip and ring lead terminals for connection to a central office,
  (b) output tip and ring lead terminals for connection to a subscriber's set,
  (c) switch means interconnecting the respective input and output tip and ring lead terminals, operated by a switch operating means,
  (d) a signal detector connected to the input tip and ring lead terminals,
  (e) decoding means adapted to detect a disconnect signal received by the signal detector and for generating an enable signal in response thereto.
  (f) said decoding means including means for detecting a signal designative of the station set and for generating a status set signal in response thereto, and
  (g) a station set status setting means, comprising memory means and means for enabling or inhibiting said switch operating means to inhibit or to allow normal operation of the switch means by the switch operating means, depending on previous status of the status setting means as stored in the memory means, upon reception by the status setting means of both the enable signal and the status set signal.

43. A circuit for disconnecting or reconnecting a station set connected to a subscriber's line from a remote location as defined in claim 42 in which the signal detector is adapted to detect ringing signals, and the decoding means is adapted to detect a ring burst disconnect or reconnect signal of a predetermined minimum period of time, and to detect said designative signal which is comprised of a coded ringing signal designative of a station set received within a predetermined time period immediately following the disconnect or reconnect signal.

44. A circuit for disconnecting or reconnecting a station set connected to a subscriber's line from a remote location as defined in claim 43, further including means for connecting a resistor between the output tip and ring lead terminals and for causing closing of said switch means for a predetermined period following reception of the disconnect or reconnect signal and said designative signal and for toggling of the status setting means into its disconnect state, and then for opening and latching of said switch means.

45. A circuit for disconnecting or reconnecting a station set connected to a subscriber's line from a remote location as defined in claim 44 further including means for causing closing of said switch means for a predetermined time period and for disconnecting said resistor from between the output tip and ring terminals, following reception of the disconnect or reconnect signal and for toggling of the status setting means into its reconnect state, for enabling normal operation of said switch operating means, and then for opening and latching said switch means.

* * * * *

UNITED STATES PATENT AND TRADEMARK OFFICE
CERTIFICATE OF CORRECTION

PATENT NO. :     4,219,700
DATED      :     August 26, 1980
INVENTOR(S) :    Guido PANIZZON et al It is certified that error appears in the above-identified patent and that said Letters Patent are hereby corrected as shown below:

Title Page as is reads now:

[73]  Assignee:  Mitel Corporation, Ontario, Canada

Title Page as it should read:

[73]  Assignee:  Mitel Corporation, Ontario, Canada and
                           Alberta Government Telephones, Alberta, Canada Signed and Sealed this Tenth Day of February 1981

[SEAL]

Attest:

Attesting Officer

RENE D. TEGTMEYER

Acting Commissioner of Patents and Trademarks